United States Patent
Kawahira et al.

(10) Patent No.: US 10,928,670 B2
(45) Date of Patent: Feb. 23, 2021

(54) LIQUID CRYSTAL DISPLAY DEVICE

(71) Applicant: SHARP KABUSHIKI KAISHA, Sakai (JP)

(72) Inventors: Yuichi Kawahira, Sakai (JP); Takako Koide, Sakai (JP); Akira Sakai, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/684,158

(22) Filed: Nov. 14, 2019

(65) Prior Publication Data

US 2020/0159066 A1 May 21, 2020

(30) Foreign Application Priority Data

Nov. 15, 2018 (JP) .............................. JP2018-214682

(51) Int. Cl.
*G02F 1/1335* (2006.01)
*G02F 1/1337* (2006.01)

(52) U.S. Cl.
CPC ...... *G02F 1/133514* (2013.01); *G02F 1/1337* (2013.01); *G02F 1/133512* (2013.01); *G02F 1/133528* (2013.01); *G02F 2201/121* (2013.01); *G02F 2201/123* (2013.01)

(58) Field of Classification Search
CPC ........... G02F 1/133514; G02F 1/133512; G02F 1/133512; G02F 1/133528; G02F 1/1337; G02F 2201/121; G02F 2201/123
USPC .......................................................... 349/104
See application file for complete search history.

(56) References Cited

U.S. PATENT DOCUMENTS

2016/0062166 A1* 3/2016 Kim .................. G02F 1/133634
349/96

FOREIGN PATENT DOCUMENTS

WO 2017/017960 A1 2/2017
WO WO-2017017960 A1 * 2/2017 ....... G02F 1/133514

* cited by examiner

*Primary Examiner* — Nathanael R Briggs
*Assistant Examiner* — William D Peterson
(74) *Attorney, Agent, or Firm* — ScienBiziP, P.C.

(57) ABSTRACT

A liquid crystal display device includes a liquid crystal panel and a circularly polarizing plate disposed on a viewing side of the liquid crystal panel. The circularly polarizing plate sequentially includes, from a viewing side, a linearly polarizing plate and an out-cell retarder. The liquid crystal panel includes a thin-film transistor substrate, a color filter substrate facing the thin-film transistor substrate and including black matrix, a horizontal alignment liquid crystal layer disposed between the thin-film transistor substrate and the color filter substrate, and an in-cell retarder disposed in one substrate disposed on the viewing side selected from the thin-film transistor substrate and the color filter substrate. The in-cell retarder is disposed outside a region between the black matrix and the horizontal alignment liquid crystal layer.

3 Claims, 18 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2018-214682 filed on Nov. 15, 2018, the contents of which are incorporated herein by reference in their entirety.

BACKGROUND OF THE INVENTION

Field of the Invention

The present invention relates to liquid crystal display devices.

Description of Related Art

Liquid crystal display devices utilize a liquid crystal composition for display. In a typical display mode, a liquid crystal panel containing a liquid crystal composition between paired substrates is irradiated with light from a backlight while voltage is applied to the liquid crystal composition to change the alignment of liquid crystal molecules, whereby the amount of light passing through the liquid crystal panel is controlled. Such liquid crystal display devices have advantageous features such as thin profile, light weight, and low power consumption, and are therefore used in electronic devices such as smartphones, tablet PCs, and automotive navigation systems. Many recent liquid crystal display devices are equipped with a touch panel.

Liquid crystal panels provided with a circularly polarizing plate on a surface thereof are known to be capable of reducing reflection of light from the surroundings (outside light) and thereby improving the outside visibility (visibility in a light environment) of liquid crystal display devices.

For example, WO 2017/017960 discloses a technique of reducing reflection of outside light while normally driving a liquid crystal display device whose liquid crystal driving mode is the fringe field switching (FFS) mode or the in-plane switching (IPS) mode. This is achieved by disposing a circularly polarizing plate that is a combination of a linearly polarizing plate and a ¼ wavelength plate on the viewing side of a liquid crystal panel and disposing a ¼ wavelength plate on the liquid crystal layer side of a color filter of a color filter substrate that is disposed on the viewing side of the liquid crystal panel.

BRIEF SUMMARY OF THE INVENTION

The present inventors developed an FFS mode liquid crystal display device (hereinafter, also referred to as a low reflective LCD) in which a circularly polarizing plate is disposed on the outermost surface of a panel to achieve good outside visibility (to reduce reflection of outside light). FIG. 25 is a schematic cross-sectional view of an FFS mode liquid crystal display device of a comparative embodiment in which a circularly polarizing plate is disposed on the outermost surface of a panel, with the entire screen displaying a green screen (with the green subpixels alone being in an electric field ON state while the subpixels other than green being in an electric field OFF state). As illustrated in FIG. 25, it is a disadvantage of the low reflective LCD that an in-cell retarder 60 serving as a λ/4 retarder is disposed inside a color filter substrate 40 to cause a great distance between a black matrix 43 and a liquid crystal layer 30, causing worse color mixture when the panel is observed from an angle (hereinafter, also referred to as parallax color mixture). This disadvantage is caused by disposing the in-cell retarder 60 on the liquid crystal layer 30 side of the color filter substrate 40 in the low reflective LCD to make the distance between the black matrix 43 and the liquid crystal layer 30 greater than that of a common FFS mode liquid crystal display device (hereinafter, also referred to as a common LCD) provided with neither a circularly polarizing plate nor an in-cell retarder. The greater the distance between the black matrix 43 and the liquid crystal layer 30 is, the smaller the angle causing color mixture is. Thus, the low reflective LCD more easily causes color mixture at a smaller angle by the thickness of the in-cell retarder 60 than a common LCD without an in-cell retarder. The arrows in FIG. 25 indicate light beams causing color mixture at the smallest incident angle. These light beams pass through the electric field ON region and a red color filter 42R or a blue color filter 42B other than the green color filter 42G. When observed in the direction indicated by the one-dot chain arrow, the panel displays a green screen with blue mixed together. When observed in the direction indicated by the two-dot chain arrow, the panel displays a green screen with red mixed together.

In contrast, the structure of Patent Literature 1 includes a ¼ wavelength plate on the liquid crystal layer side of the color filter of the color filter substrate as in the structure of Comparative Embodiment 1. This disadvantageously causes worsening of parallax color mixture.

In response to the above issues, the present invention aims to provide a liquid crystal display device capable of reducing reflection of outside light, of achieving good outside visibility, and of reducing worsening of parallax color mixture.

(1) An embodiment of the present invention relates to a liquid crystal display device including: a liquid crystal panel; and a circularly polarizing plate disposed on a viewing side of the liquid crystal panel, the circularly polarizing plate sequentially including, from a viewing side, a linearly polarizing plate and an out-cell retarder, the liquid crystal panel including: a thin-film transistor substrate; a color filter substrate facing the thin-film transistor substrate and including a black matrix; a horizontal alignment liquid crystal layer disposed between the thin-film transistor substrate and the color filter substrate; and an in-cell retarder disposed in one substrate disposed on the viewing side selected from the thin-film transistor substrate and the color filter substrate, the in-cell retarder being disposed outside a region between the black matrix and the horizontal alignment liquid crystal layer.

(2) In an embodiment of the present invention, the liquid crystal display device includes the structure (1), the in-cell retarder is disposed in the thin-film transistor substrate, and the liquid crystal panel sequentially includes, from the viewing side, the thin-film transistor substrate including the in-cell retarder, the horizontal alignment liquid crystal layer, and the color filter substrate including the black matrix.

(3) In an embodiment of the present invention, the liquid crystal display device includes the structure (2), the thin-film transistor substrate includes a thin-film transistor, a pixel electrode coupled with the thin-film transistor, and a common electrode facing the pixel electrode, and the pixel electrode and the common electrode are disposed on a back side of the in-cell retarder.

(4) In an embodiment of the present invention, the liquid crystal display device includes the structure (2) or (3), the thin-film transistor substrate includes a conductive line layer including a metal line and a thin-film transistor coupled with the metal line, and the conductive line layer is disposed on the viewing side of the in-cell retarder.

(5) In an embodiment of the present invention, the liquid crystal display device includes the structure (1), the in-cell retarder is disposed in the color filter substrate, and the liquid crystal panel sequentially includes, from the viewing side, the in-cell retarder, the black matrix, the horizontal alignment liquid crystal layer, and the thin-film transistor substrate.

The present invention can provide a liquid crystal display device capable of reducing reflection of outside light, of achieving good outside visibility, and of reducing worsening of parallax color mixture.

DETAILED DESCRIPTION OF THE INVENTION

Definitions

In the present description, the term "viewing side" means the side closer to the screen (display surface) of a liquid crystal display device, while the term "back side" means the side farther from the screen (display surface) of the liquid crystal display device.

The term "retardation" as used herein means the in-plane retardation at a wavelength of 550 nm, unless otherwise specified.

The term "λ/4 retarder" as used herein means a retarder that gives an in-plane retardation equivalent to ¼ of the wavelength to at least light at a wavelength of 550 nm. The light to which the in-plane retardation is given may be at a wavelength of 100 nm or longer and 176 nm or shorter. The light at a wavelength of 550 nm is light to which the luminosity factor of a human is the highest. The in-plane retardation is defined by $R=(ns-nf) \times d$, wherein $ns$ represents the greater principal refractive index of a retarder in the in-plane direction selected from the principal refractive indices $nx$ and $ny$; $nf$ is the smaller principal refractive index of the retarder in the in-plane direction selected from the principal refractive indices nx and ny; and d represents the thickness of the retarder. The principal refractive indices are values to light at a wavelength of 550 nm, unless otherwise specified. The slow axis of a retarder means the axis in the direction corresponding to ns, while the fast axis thereof means the axis in the direction corresponding to nf.

Hereinafter, embodiments of the present invention are described. The contents of the following embodiments are not intended to limit the scope of the present invention. Any features of the embodiments may appropriately be combined or changed within the spirit of the present invention.

Figure 25:
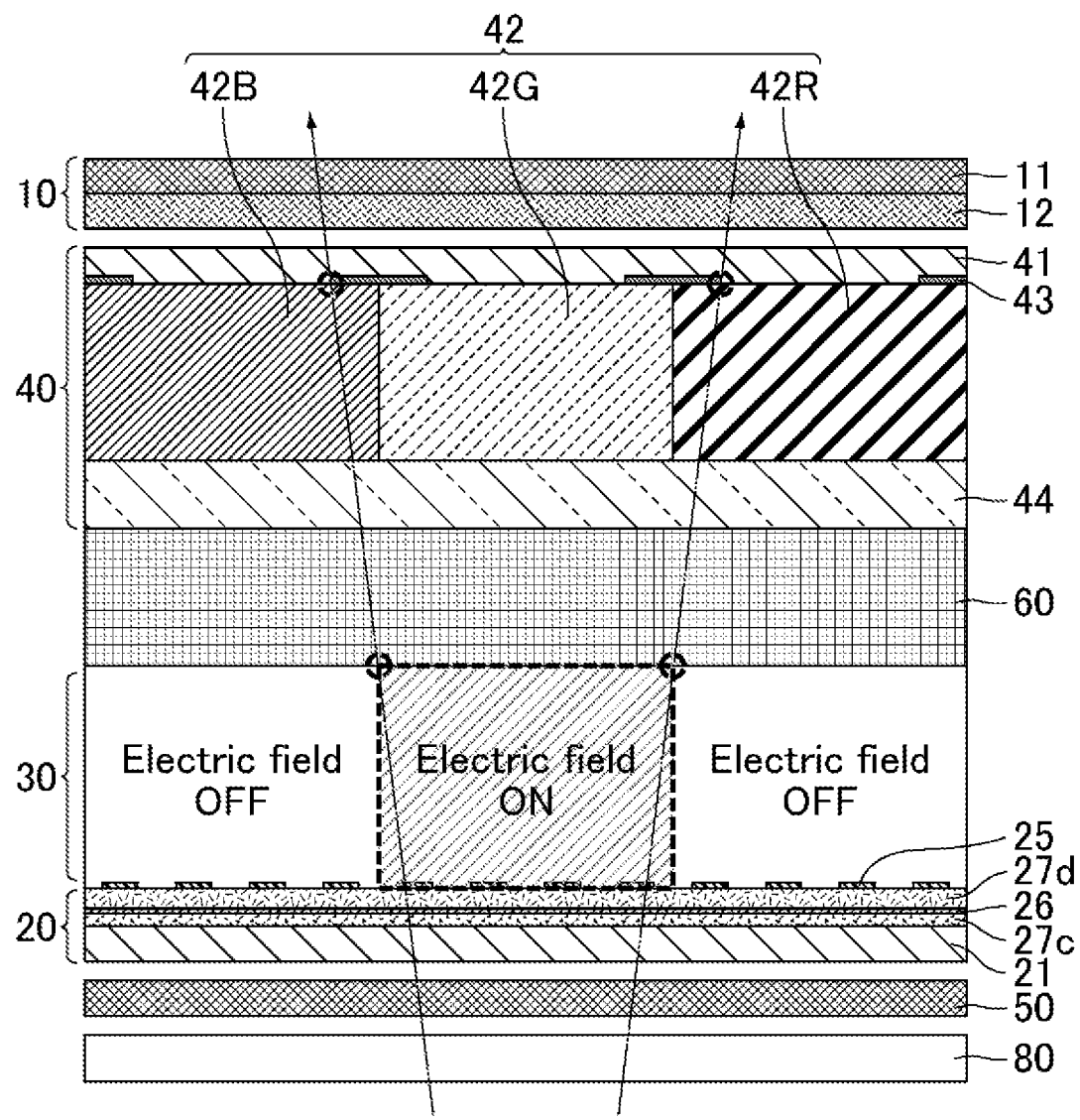
FIG. 25 is a schematic cross-sectional view of an FFS mode liquid crystal display device of a comparative embodiment in which a circularly polarizing plate is disposed on the outermost surface of a panel, with the entire screen displaying a green screen (with the green subpixels alone being in an electric field ON state while the subpixels other than green being in an electric field OFF state).

The low reflective LCD of the comparative embodiment illustrated in FIG. 25 includes the color filter substrate 40 on the viewer side and a TFT substrate 20 on the backlight 80 side. In an embodiment of the present invention, the TFT substrate 20 is disposed on the viewer side, the color filter substrate 40 is disposed on the backlight 80 side, and the in-cell retarder 60 is disposed in the TFT substrate 20. This can theoretically reduce the disadvantage of parallax color mixture. As described above, disposing the in-cell retarder 60 outside a region between the black matrix 43 and the liquid crystal layer 30 in the liquid crystal display device including a circularly polarizing plate 10 on the viewing side of the liquid crystal panel can prevent formation of a great distance between the black matrix 43 and the liquid crystal layer 30. Thereby, the liquid crystal display can achieve a color mixture level equivalent to that of a common LCD.

Embodiment 1

Figure 1:
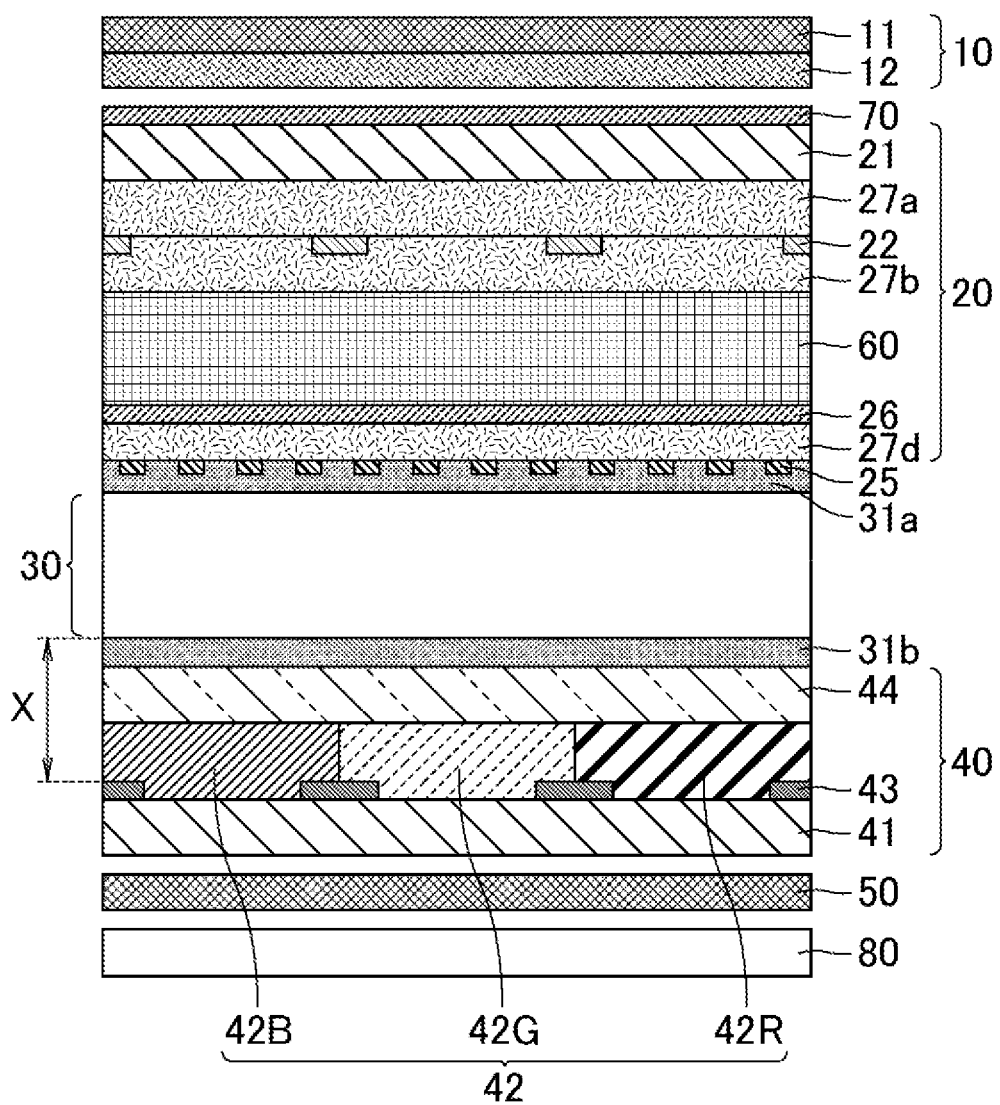
FIG. 1 is a schematic cross-sectional view of a structure of a liquid crystal display device of Embodiment 1.
Figure 2:
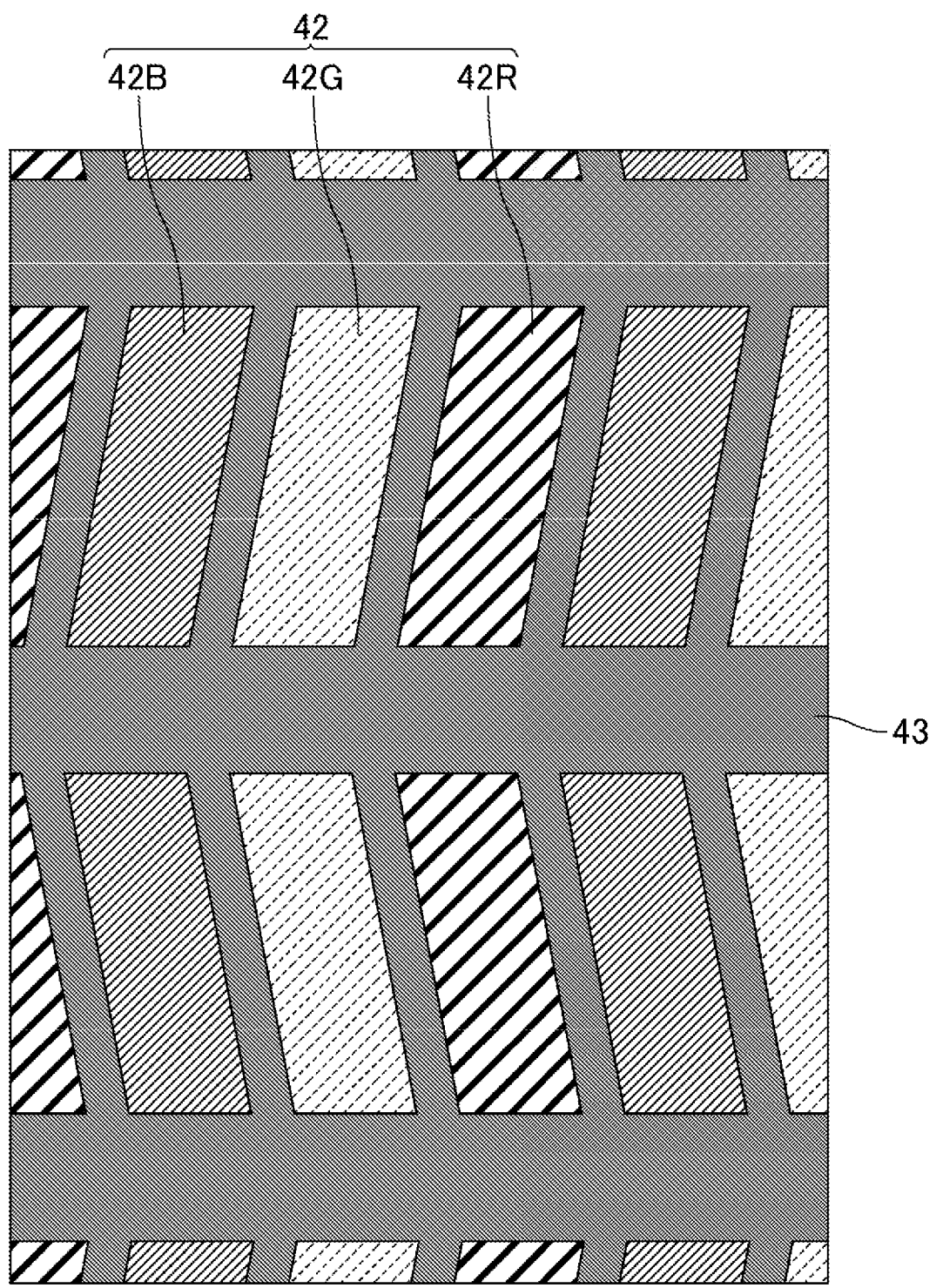
FIG. 2 is a schematic plan view of a color filter substrate of the liquid crystal display device of Embodiment 1.
Figure 3:
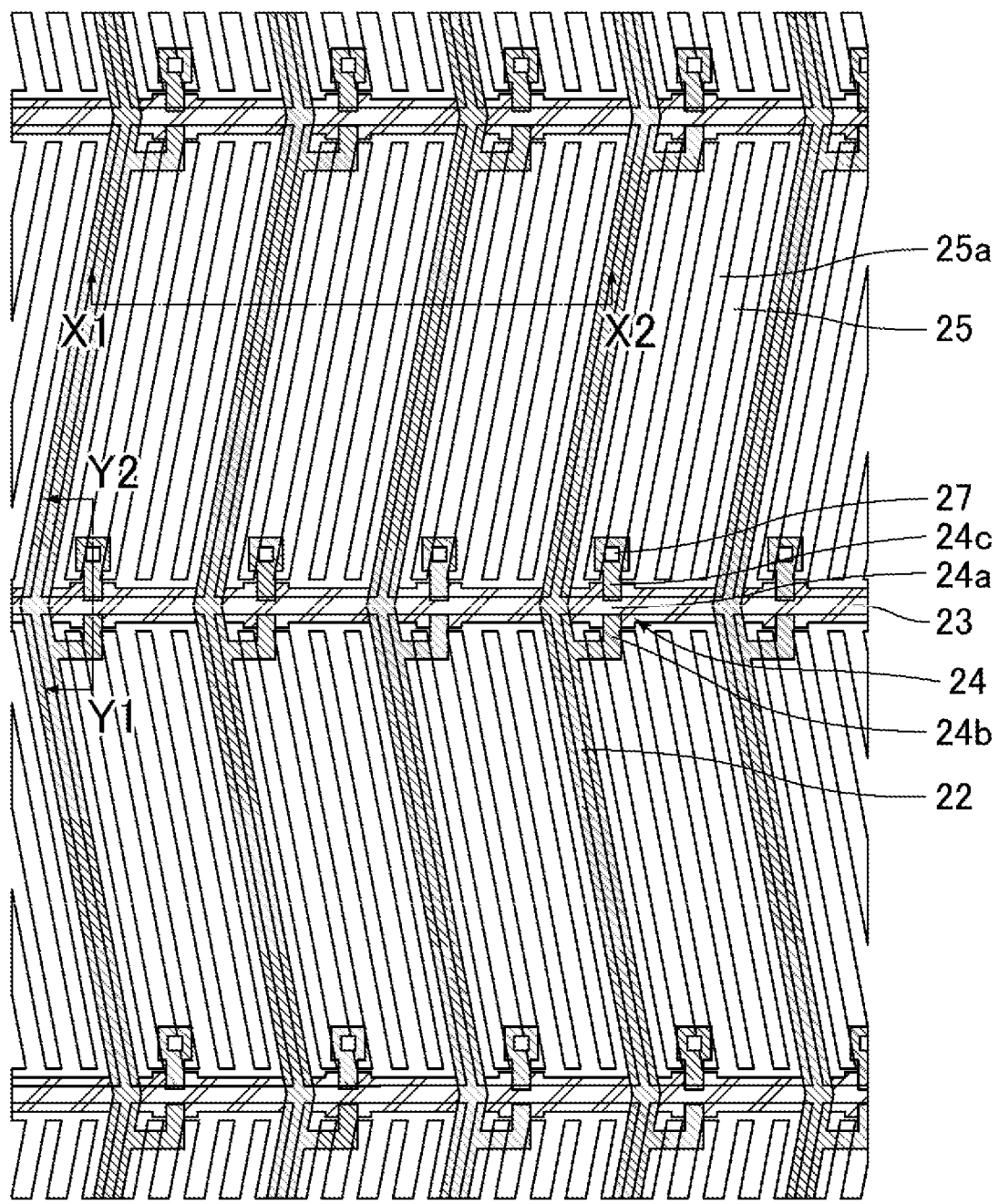
FIG. 3 is a schematic plan view of a TFT substrate of the liquid crystal display device of Embodiment 1.
Figure 4:
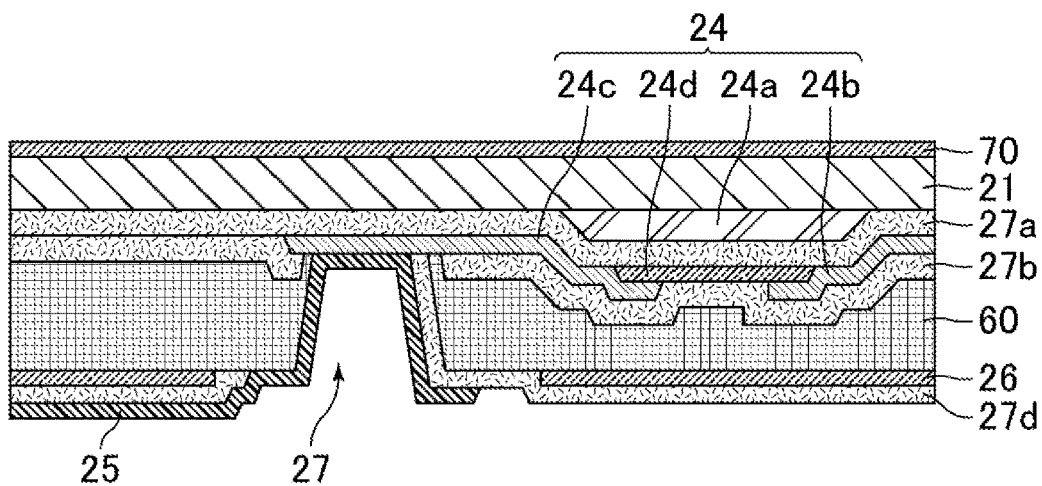
FIG. 4 is a schematic cross-sectional view of the TFT substrate of the liquid crystal display device of Embodiment 1, illustrating a TFT portion.

FIG. 1 is a schematic cross-sectional view of a structure of a liquid crystal display device of Embodiment 1. FIG. 2 is a schematic plan view of a color filter substrate of the liquid crystal display device of Embodiment 1. FIG. 3 is a schematic plan view of a TFT substrate of the liquid crystal display device of Embodiment 1. FIG. 4 is a schematic cross-sectional view of the TFT substrate of the liquid crystal display device of Embodiment 1, illustrating a TFT portion. FIG. 1 corresponds to the cross section taken along the X1-X2 line in FIG. 3. FIG. 4 corresponds to the cross section taken along the Y1-Y2 line in FIG. 3. The liquid crystal display device of the present embodiment is an FFS mode liquid crystal display device (low reflective LCD) including a circularly polarizing plate. As illustrated in FIG. 1, the liquid crystal display device includes a liquid crystal panel that sequentially includes, from the viewing side, the circularly polarizing plate 10, a thin-film transistor (hereinafter, TFT) substrate 20, the liquid crystal layer 30, the color filter substrate 40, and a linearly polarizing plate 50. Accordingly, the liquid crystal display device of the present embodiment has a structure in which the arrangement of the color filter substrate and the TFT substrate is reversed from that in a common liquid crystal display device in which the color filter substrate, the liquid crystal layer, and the TFT substrate are arranged in the stated order from the viewing side.

The combination of the color filter substrate 40, the liquid crystal layer 30, and the TFT substrate 20 is also referred to as a "liquid crystal cell". The region between the color filter substrate 40 and the TFT substrate 20 is referred to as an "in cell" and the region closer to the viewing side than the liquid crystal cell and the region closer to the back side than the liquid crystal cell are each referred to as an "out cell".

The circularly polarizing plate 10 includes a linearly polarizing plate 11 and a λ/4 retarder (out-cell retarder) 12.

The linearly polarizing plate 11 used may be a polarizer (absorptive polarizing plate) obtained by causing an anisotropic material such as an iodine complex (or a dye) to be adsorbed on a polyvinyl alcohol (PVA) film to dye the film, and then stretch-aligning the film, for example. In order to ensure mechanical strength and wet and heat resistance, each surface of the PVA film is usually provided with a protecting film such as a triacetyl cellulose (TAC) film before practical use.

The out-cell retarder 12 can be formed by attachment to the liquid crystal cell. Thus, a stretched polymer film commonly used in the field of liquid crystal display devices can suitably be used. Examples of the material of the polymer film include cycloolefin polymers, polycarbonate, polysulfone, polyethersulfone, polyethylene terephthalate, polyethylene, polyvinyl alcohol, norbornene, triacetyl cellulose, and diacetyl cellulose. Particularly preferred among these are cycloolefin polymers. A retardation layer formed from a cycloolefin polymer has advantages such as excellent durability and a small change in retardation after long-term exposure to a high-temperature environment or a high-temperature high-humidity environment. Examples of known cycloolefin polymer films include "ZeonorFilm®" available from Zeon Corp. and "ARTON® film" available from JSR Corp.

The color filter substrate 40 includes a color filter layer 42 and the black matrix 43 disposed on a support substrate 41 such as a glass substrate or a plastic substrate. As illustrated in FIG. 2, the color filter layer may have a structure in which red color filters 42R, green color filters 42G, and blue color filters 42B are arranged in the plane, for example. The red color filters 42R, the green color filters 42G, and the blue color filters 42B are partitioned by the black matrix 43. The red color filters 42R, the green color filters 42G, and the blue color filters 42B and the black matrix 43 each may be formed from a transparent resin containing a pigment, for example. Each of the pixels arranged in a matrix pattern is usually provided with a combination of a red color filter 42R, a green color filter 42G, and a blue color filter 42B. The colors of color light beams each obtained through the red color filter 42R, the green color filter 42G, or the blue color filter 42B are mixed while the amounts of the color light beams are controlled, so that each pixel can exhibit a desired color. In each pixel, the regions each provided with a color filter selected from the red color filters 42R, the green color filters 42G, and the blue color filters 42B, i.e., the regions partitioned by the black matrix 43, are also referred to as subpixels.

As illustrated in FIG. 1, the color filter substrate 40 may include an overcoat layer 44 that covers a surface of the color filter layer 42. The overcoat layer 44 can prevent dissolution of impurities in the color filter layer 42 into other layers and can flatten the surface on the color filter layer 42. The material of the overcoat layer 44 is preferably a transparent resin.

As illustrated in FIGS. 3 and 4, the TFT substrate 20 includes source lines 22 parallel to each other, gate lines 23 parallel to each other and crossing the source lines 22, TFTs 24 provided for the respective subpixels and serving as switching elements, pixel electrodes (signal electrodes) 25 provided for the respective subpixels and provided with one or more slits 25a, and a common electrode (counter electrode) 26 disposed in a planar pattern on substantially the entire display region except for contact holes 27 each of which enables coupling of a pixel electrode 25 with a drain electrode 24c of the corresponding TFT 24. Each subpixel corresponds to a region surrounded by two adjacent source lines 22 and two adjacent gate lines 23. Each TFT 24 is a three-terminal switch that is coupled with the corresponding source line 22 and gate line 23 and that includes a gate electrode 24a coupled with the corresponding gate line 23, a source electrode 24b coupled with the corresponding source line 22, a drain electrode 24c coupled with the corresponding pixel electrode 25, and a thin-film semiconductor 24d. Each pixel electrode 25 is coupled with the corresponding source line 22 via the corresponding thin-film semiconductor 24d.

The TFT substrate 20 has a structure that is a stack including, on the support substrate 21, a gate layer including the gate lines 23 and the gate electrodes 24a, an interlayer insulating film (gate insulator) 27a covering the gate layer, the thin-film semiconductors 24d on the interlayer insulating film 27a, a source layer including the source lines 22, the source electrodes 24b, and the drain electrodes 24c, an interlayer insulating film 27b and a λ/4 retarder (in-cell retarder) 60 both covering the source layer, the common electrode 26 on the in-cell retarder 60, an interlayer insulating film 27d covering the common electrode 26, and the pixel electrodes 25 on the interlayer insulating film 27d, in the stated order.

The material of the conductive line layers, i.e., the gate layer and the source layer, is a metal such as aluminum (Al), copper (Cu), or titanium (Ti). The conductive lines such as the gate lines 23 and the source lines 22 in these conductive line layers are metal lines formed from a metal. The metal may be an alloy. In the present embodiment, the gate layer and the source layer may be formed from a multilayer film of titanium (Ti) and copper (Cu), for example.

The material of the interlayer insulating films 27a, 27b and 27d may be an inorganic insulating film of silicon nitride (SiNx), silicon dioxide ($SiO_2$), or the like, for example. In the present embodiment, the material of the interlayer insulating films 27a and 27b is silicon dioxide ($SiO_2$) and the material of the interlayer insulating film 27d is silicon nitride (SiNx).

The thin-film semiconductors 24d each may be an oxide semiconductor layer and may contain at least one metal element selected from In, Ga, and Zn, for example. In the present embodiment, the thin-film semiconductors 24d contain an In—Ga—Zn—O semiconductor. The In—Ga—Zn—O semiconductor is a ternary oxide of indium (In), gallium (Ga), and zinc (Zn), and may have any proportions (compositional ratio) of In, Ga, and Zn. The compositional ratio In:Ga:Zn may be 2:2:1, 1:1:1, 1:1:2, or the like.

The material of the pixel electrodes 25 and the common electrode 26 may be a transparent conductive material such as indium tin oxide (ITO), indium zinc oxide (IZO), indium gallium zinc oxide (In—Ga—Zn—O), zinc oxide (ZnO), or tin oxide (SnO), for example.

Figure 5:
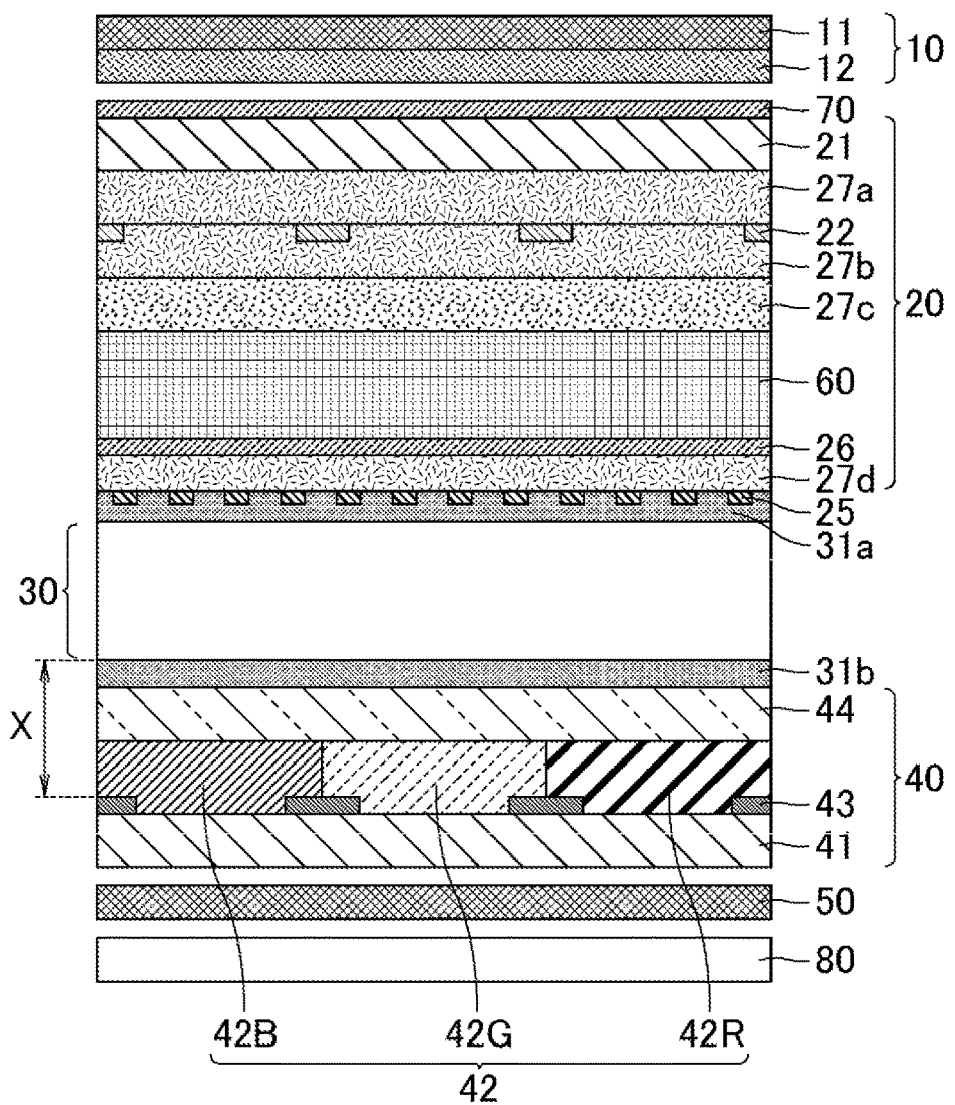
FIG. 5 is a schematic cross-sectional view of another structure of the liquid crystal display device of Embodiment 1.
Figure 6:
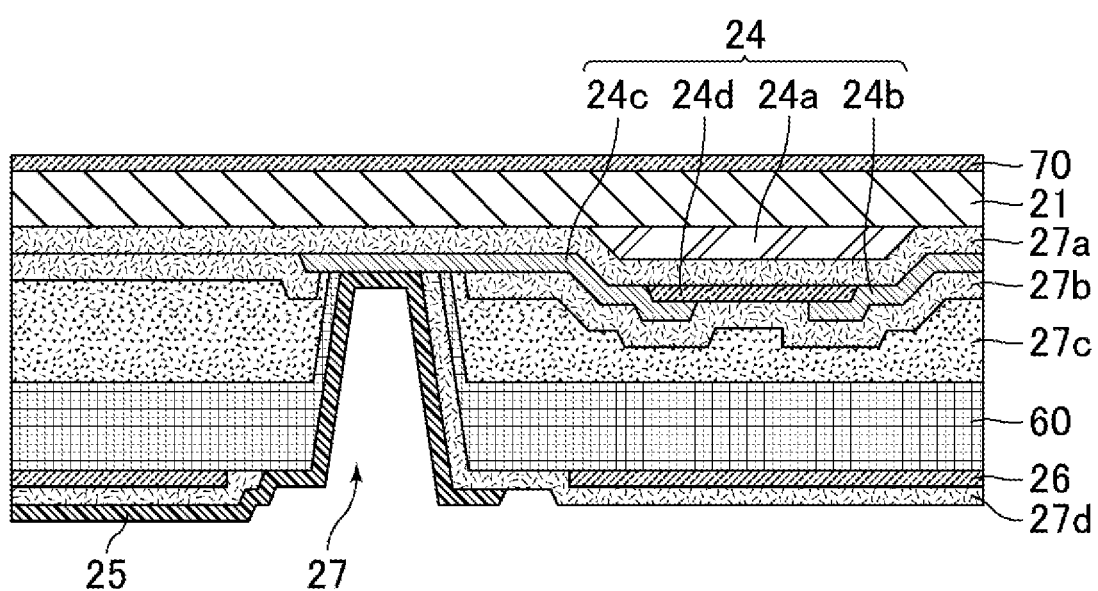
FIG. 6 is a schematic cross-sectional view of another TFT substrate of the liquid crystal display device of Embodiment 1, illustrating a TFT portion.

FIG. 5 is a schematic cross-sectional view of another structure of the liquid crystal display device of Embodiment 1. FIG. 6 is a schematic cross-sectional view of another TFT substrate of the liquid crystal display device of Embodiment 1, illustrating a TFT portion. FIG. 5 corresponds to the cross section taken along the X1-X2 line in FIG. 3. FIG. 6 corresponds to the cross section taken along the Y1-Y2 line in FIG. 3. As illustrated in FIGS. 5 and 6, the TFT substrate 20 may further include an interlayer insulating film 27c covering the interlayer insulating film 27b, and the in-cell retarder 60 may be disposed to cover the interlayer insulating film 27c. The interlayer insulating film 27c functions as a flattening film, and may be formed from a transparent resin such as an acrylic resin material, e.g., polymethyl methacrylate resin (PMMA), for example.

A planar transparent electrode 70 is disposed on the viewing side surface of the TFT substrate 20 to prevent the liquid crystal panel from being electrically charged. The material of the transparent electrode 70 may be a transparent conductive material such as indium tin oxide (ITO), indium zinc oxide (IZO), indium gallium zinc oxide (In—Ga—Zn—O), zinc oxide (ZnO), or tin oxide (SnO), for example.

The in-cell retarder (in-cell retardation layer) 60 is disposed in one substrate disposed on the viewing side selected from the TFT substrate 20 and the color filter substrate 40 (in the present embodiment, the TFT substrate 20) so as to cancel the retardation of the out-cell retarder 12 at least in the front direction, thereby achieving a state where the out-cell retarder 12 and the in-cell retarder 60 are substantially absent. Disposing the in-cell retarder 60 together with the circularly polarizing plate 10 can lead to optical characteristics similarly to those of a common LCD in transmissive display while reducing reflection of outside light.

From this viewpoint, the retardation of the in-cell retarder 60 is preferably substantially equal to the retardation of the out-cell retarder 12. Specifically, the difference between the retardations is preferably 5.0 nm or smaller, more preferably 2.5 nm or smaller.

The in-cell retarder 60 used is preferably a cured product of a reactive liquid crystal polymer (also referred to as "reactive mesogen"). The reactive liquid crystal polymer enables formation of the in-cell retarder 60 by application during a process of producing the TFT substrate 20 or the color filter substrate 40, thereby leading to a thin liquid crystal panel. The in-cell retarder 60 may have a thickness of 1.0 μm to 3.0 μm, preferably 2.0 μm to 2.5 μm.

The reactive liquid crystal polymer is preferably a liquid crystal polymer containing a photo-reactive group. The liquid crystal polymer containing a photo-reactive group may be a polymer that has a side chain having a structure including both a substituent (mesogen group), such as a biphenyl group, a terphenyl group, a naphthalene group, a phenyl benzoate group, an azobenzene group, or a derivative thereof, and a photo-reactive group, such as a cinnamoyl group, a chalcone group, a cinnamylidene group, a β-(2-phenyl)acryloyl group, a cinnamic acid group, or a derivative thereof, and that has a main chain having a structure of acrylate, methacrylate, maleimide, N-phenyl maleimide, siloxane, or the like. This polymer may be a homopolymer consisting of a single species of repeating units or may be a copolymer including two or more species of repeating units having different side chain structures. This copolymer encompasses an alternating copolymer, a random copolymer, and a graft copolymer. In this copolymer, a side chain of at least one repeating unit species is a side chain having the aforementioned structure including both a mesogen group and a photo-reactive group and side chains of the other repeating unit species are those having neither a mesogen group nor a photo-reactive group.

Examples of a solvent used in application of the reactive liquid crystal polymer include toluene, ethyl benzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methyl cyclohexane, tetrahydrofuran, dioxane, cyclohexanone, n-hexane, ethyl acetate, butyl acetate, propylene glycol methyl ether acetate, methoxy butyl acetate, N-methylpyrrolidone, and dimethyl acetamide. Any of these may be used alone, or two or more of these may be used in combination.

The retardation layer formed from the reactive liquid crystal polymer may specifically be formed by the following method. First, a base alignment film is formed on the TFT substrate 20 or the color filter substrate 40 and subjected to an alignment treatment such as rubbing or light irradiation, so that the alignment azimuth is fixed. The reactive liquid crystal polymer is applied to the base alignment film after the alignment treatment and is cured by baking, light irradiation, or the like. The cured reactive liquid crystal polymer is aligned along the alignment azimuth of the base alignment film to function as a retardation layer. The retardation of the retardation layer is defined by the product of the birefringence Δn of the reactive liquid crystal polymer and the thickness d of the retardation layer. Thus, the in-cell retarder 60 may be a stack of the base alignment film and a layer of the cured product of the reactive liquid crystal polymer formed on the base alignment film. The retardation layer may be formed on the TFT substrate 20 or the color filter substrate 40 by a method of transferring a layer of the cured product of the reactive liquid crystal polymer to the TFT substrate 20 or the color filter substrate 40 using a transfer film that includes, on a base film such as a PET film, the base alignment film after the alignment treatment and the layer of the cured product of the reactive liquid crystal polymer in the stated order. In this case, the layer of the cured product of the reactive liquid crystal polymer alone may be transferred to the TFT substrate 20 or the color filter substrate 40 by adjusting the adhesion between the base alignment film and the base film to be higher than the adhesion between the layer of the cured product of the reactive liquid crystal polymer and the base alignment film.

The liquid crystal layer 30 is a horizontal alignment liquid crystal layer and contains liquid crystal that is horizontally aligned in a no-voltage-applied state. The liquid crystal may be either positive liquid crystal or negative liquid crystal. The surfaces sandwiching the liquid crystal layer 30 are provided with horizontal alignment films 31a and 31b that control the alignment of the liquid crystal. The horizontal alignment films 31a and 31b may be formed from any material, such as a decomposable photo-alignment film material. The thickness of each of the horizontal alignment films 31a and 31b may be, but is not limited to, 0.1 μm. The liquid crystal in the liquid crystal layer 30 is horizontally aligned by the regulating force of the horizontal alignment films 31a and 31b in a state (in a no-voltage-applied state) where no voltage is applied between the paired transparent electrodes, i.e., a set of the pixel electrode 25 and the common electrode 26, disposed in the TFT substrate 20. In contrast, the liquid crystal is rotated in the in-plane direction in response to a fringe electric field (horizontal electric field) generated in the liquid crystal layer 30 in a state (in a voltage-applied state) where voltage is applied between a set of the pixel electrodes 25 and the common electrode 26. In the case of positive liquid crystal, the alignment azimuth of the liquid crystal in a no-voltage-applied state is set to the upward-downward direction of FIG. 3 and the angle formed with the extending direction of a linear portion (slit 25a) of the corresponding pixel electrode 25 is set to 5° to 15°. In the case of negative liquid crystal, the alignment azimuth of the liquid crystal in a no-voltage-applied state is set to the left-right direction of FIG. 3 and the angle formed with the extending direction of a linear portion (slit 25a) of the corresponding pixel electrode 25 is set to 75° to 85°.

As described above, the TFT substrate 20 used includes a set of the pixel electrodes 25 and the common electrode 26 as the paired electrodes and can form a horizontal electric field such as a fringe electric field in the liquid crystal layer 30. In the present embodiment, the liquid crystal driving mode may be the FFS mode or another horizontal electric field mode such as the in-plane switching (IPS) mode. In the case of the IPS mode, each pixel electrode and the common electrode are comb-shaped electrodes and are arranged such that the comb teeth of these electrodes fit to each other by spaces. The pixel electrodes and the common electrode are usually disposed in the same electrode layer or in adjacent electrode layers with an interlayer insulating film in between.

The linearly polarizing plate 50 used may be a polarizer (absorptive polarizing plate) obtained by causing an anisotropic material such as an iodine complex (or a dye) to be adsorbed on a polyvinyl alcohol (PVA) film to dye the film, and then stretch-aligning the film, for example. In order to ensure mechanical strength and wet and heat resistance, each surface of the PVA film is usually provided with a protecting film such as a triacetyl cellulose (TAC) film before practical use.

The liquid crystal panel is provided with a backlight 80 on the back side. The light emitted from the backlight 80 is affected by voltage applied to the liquid crystal layer 30 in the liquid crystal panel, so that the amount of the light passing through the liquid crystal panel is controlled. The type of the backlight 80 may be, but is not limited to, an edge-lit type or a direct-lit type. The light source of the backlight 80 may be, but is not limited to, a light emitting diode (LED) or a cold cathode fluorescent lamp (CCFL).

Letting the direction (azimuth) of the transmission axis of the linearly polarizing plate 11 be 0°, the direction of the slow axis of the out-cell retarder 12 is −40° to −50°, preferably −42.5° to −47.5°; the direction of the slow axis of the in-cell retarder 60 is +40° to +50°, preferably +42.5° to +47.5°; the direction of the slow axis of the liquid crystal layer 30 is −5° to +5°, preferably −2.5° to +2.5° and the retardation thereof is 250 nm to 350 nm, preferably 270 nm to 320 nm; and the direction of the transmission axis of the linearly polarizing plate 50 is +85° to +95°, preferably +87.5° to +92.5°. Relative to the direction (azimuth) of the transmission axis of the linearly polarizing plate 11, the counterclockwise direction is defined as the positive angle and the clockwise direction is defined as the negative angle when observed from the viewing side.

The TFT substrate 20 further includes a source driver (not illustrated) coupled with the source lines 22, a gate driver (not illustrated) coupled with the gate lines 23, and a controller (not illustrated) coupled with these drivers. The gate driver successively supplies scanning signals to the gate lines 23 based on the control by the controller. The source driver supplies data signals to the source lines 22 based on the control by the controller at a timing when the TFTs 24 are turned into a voltage-applied state by the scanning signals. Each pixel electrode 25 is set to a potential corresponding to the data signal supplied through the corresponding TFT 24. Then, a fringe electric field (horizontal electric field) is generated between the pixel electrode 25 provided with a slit 25a and the planar common electrode 26 placed in the layer below the pixel electrode 25 with the interlayer insulating film 27d in between, rotating liquid crystal molecules in the liquid crystal layer 30. Thereby, the voltage level applied between the pixel electrode 25 and the common electrode 26 is controlled to change the retardation of the liquid crystal layer 30, switching transmission and non-transmission of light.

In the present embodiment, the in-cell retarder 60 is disposed outside a region X between the black matrix 43 and the liquid crystal layer 30. In other words, the in-cell retarder 60 is not disposed in a region between the black matrix 43 and the liquid crystal layer 30. Specifically, the in-cell retarder 60 is disposed in the TFT substrate 20, and the TFT substrate 20 including the in-cell retarder 60, the liquid crystal layer 30, and the black matrix 43 are arranged in the stated order from the viewing side. In this case, the distance between the black matrix 43 and the liquid crystal layer 30 can be not greater than the distance between the black matrix and the liquid crystal layer in a common LCD including no in-cell retarder. This can theoretically reduce the disadvantage of parallax color mixture that may be worsened by the presence of an in-cell retarder.

Further, disposing the circularly polarizing plate 10 on the viewing side of the liquid crystal panel and disposing the in-cell retarder 60 in the TFT substrate 20 on the viewing side allows the circularly polarizing plate 10 to absorb reflected light generated between the circularly polarizing plate 10 and the in-cell retarder 60, such as light reflected on a surface of the transparent electrode 70. This can reduce reflection of outside light and lead to good outside visibility.

Placing the TFT substrate 20 on the viewing side causes a disadvantage of reflection of outside light from metal lines such as the gate lines 23 and the source lines 22. Still, in the present embodiment, the gate layer and the source layer, which are conductive line layers including metal lines, are disposed on the viewing side of the in-cell retarder 60. This allows the circularly polarizing plate 10 to absorb light reflected on surfaces of metal lines in the gate layer and the source layer and of metal electrodes. This is because the effect of reducing reflection of outside light is directed to reflection from the layers between the circularly polarizing plate 10 and the in-cell retarder 60.

In the present embodiment, the pixel electrodes 25 and the common electrode 26 are disposed on the back side (on the liquid crystal layer 30 side) of the in-cell retarder 60. Specifically, the in-cell retarder 60 is disposed on the viewing side of the common electrode 26. Thereby, the paired electrodes, i.e., a set of the pixel electrodes 25 and the common electrode 26, can be placed near the liquid crystal layer 30 and these electrodes can drive the liquid crystal in a usual manner similarly to a common LCD.

The arrangement of the pixel electrodes 25 and the common electrode 26 may be reversed such that the common electrode 26 provided with one or more slits for each subpixel is disposed on the liquid crystal layer 30 side of the planar pixel electrode 25 with the interlayer insulating film 27d in between. In this case, the in-cell retarder 60 is disposed on the viewing side of the pixel electrode 25, but the pixel electrode 25 and the common electrode 26 are still disposed on the back side (on the liquid crystal layer 30 side) of the in-cell retarder 60. Thus, similarly to the case of the above arrangement, these electrodes can drive the liquid crystal in a usual manner.

As described above, when the liquid crystal driving mode in the present embodiment is the FFS mode, the in-cell retarder 60, one electrode (lower electrode) selected from the pixel electrode(s) 25 and the common electrode 26, the interlayer insulating film 27d, the other electrode (upper electrode) selected from the pixel electrode(s) 25 and the common electrode 26, the horizontal alignment film 31a, and the liquid crystal layer 30 are preferably arranged in the stated order from the viewing side in order to drive the liquid crystal by the pixel electrode(s) 25 and the common electrode 26 in a usual manner.

Also, when the liquid crystal driving mode in the present embodiment is the IPS mode, disposing the pixel electrode (s) and the common electrode on the back side (on the liquid crystal layer 30 side) of the in-cell retarder 60 enables driving the liquid crystal in a usual manner.

Example 1

Figure 7:
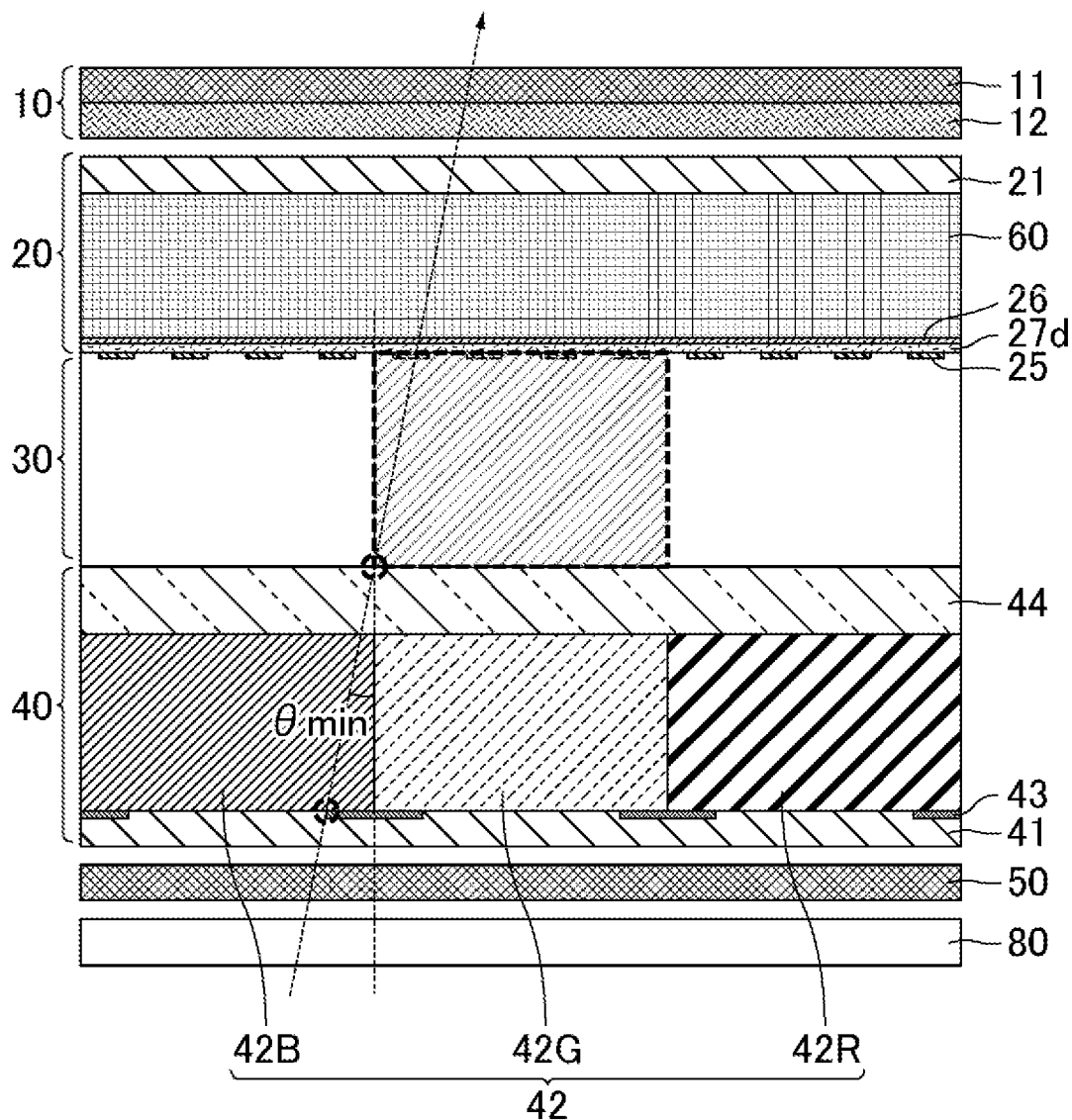
FIG. 7 is a cross-sectional view of a structure of a liquid crystal display device of Example 1 used for calculation.

With the structure of Embodiment 1, the chromaticity (u', v') was calculated using LCD Master when the panel displaying a single color selected from blue, green, red was observed from the front and from an angle (polar angle of 60° and an azimuth angle of 0° or 180°). FIG. 7 is a cross-sectional view of a structure of a liquid crystal display device of Example 1 used for calculation. The 2D model illustrated in FIG. 7 was used for calculation.

In the examples and the comparative examples, the azimuth angle 0° and the azimuth angle 180° are respectively defined as the direction of observing the panel from the right of the sheet and the left of the paper in the figure of the cross-sectional structure used for calculation.

The thickness of the in-cell retarder 60 was set to 1.0 µm, 2.0 µm, or 3.0 µm. The thickness of the interlayer insulating film 27d was set to 0.2 µm. The line (L)/space (S) ratio of each pixel electrode 25 was set to 2.2 µm/3.2 µm. The thickness of the liquid crystal layer 30 was set to 3.0 µm. The thickness of the overcoat layer 44 was set to 1.0 µm. The widths of the red color filters 42R, the green color filters 42G, and the blue color filters 42B were each set to 21.2 µm. The thicknesses of the red color filters 42R, the green color filters 42G, and the blue color filters 42B were each set to 2.5 µm. The width of the black matrix 43 was set to 6.6 µm.

Figure 8:
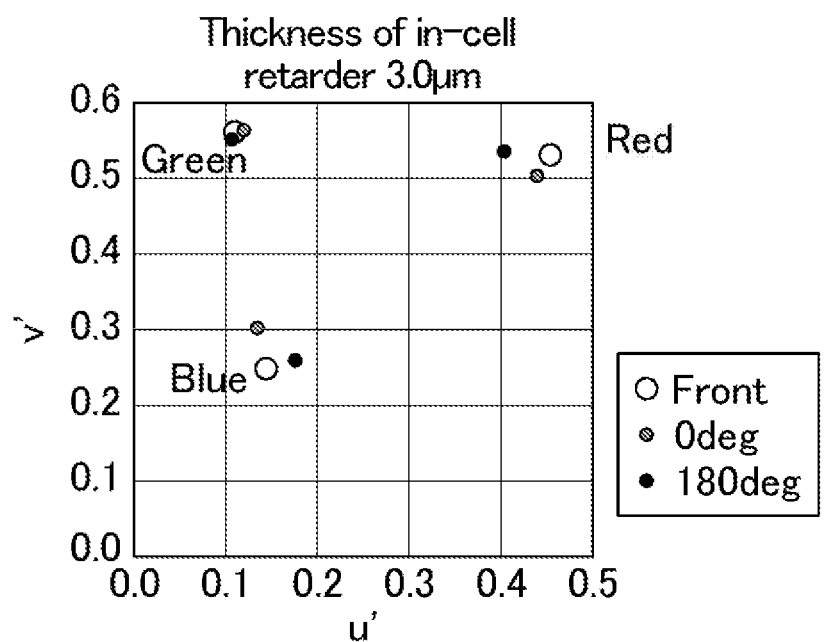
FIG. 8 is a graph of the results of calculating the chromaticity (u', v') when the panel displaying a single color selected from blue, green, and red was observed from the front and from an angle in Example 1, with a 3.0-μm-thick in-cell retarder.
Figure 9:
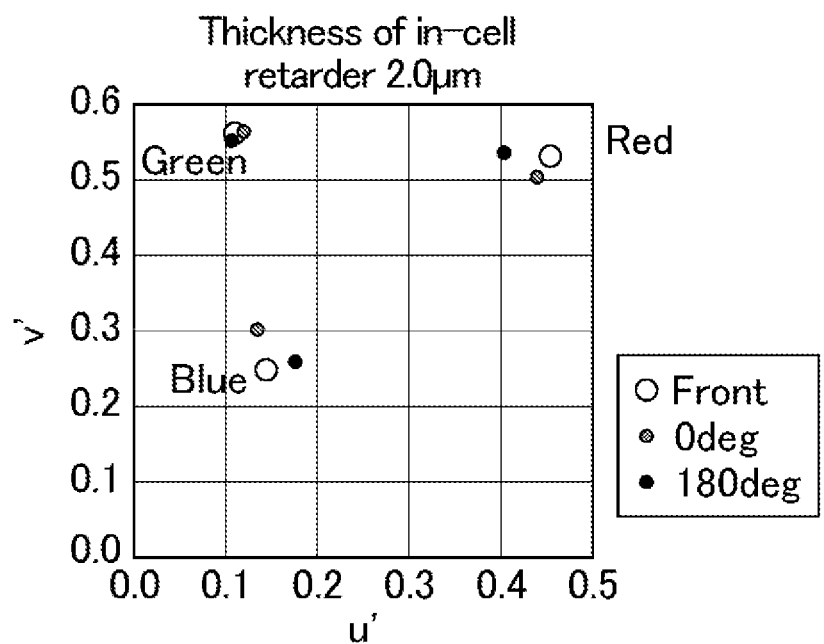
FIG. 9 is a graph of the results of calculating the chromaticity (u', v') when the panel displaying a single color selected from blue, green, and red was observed from the front and from an angle in Example 1, with a 2.0-μm-thick in-cell retarder.
Figure 10:
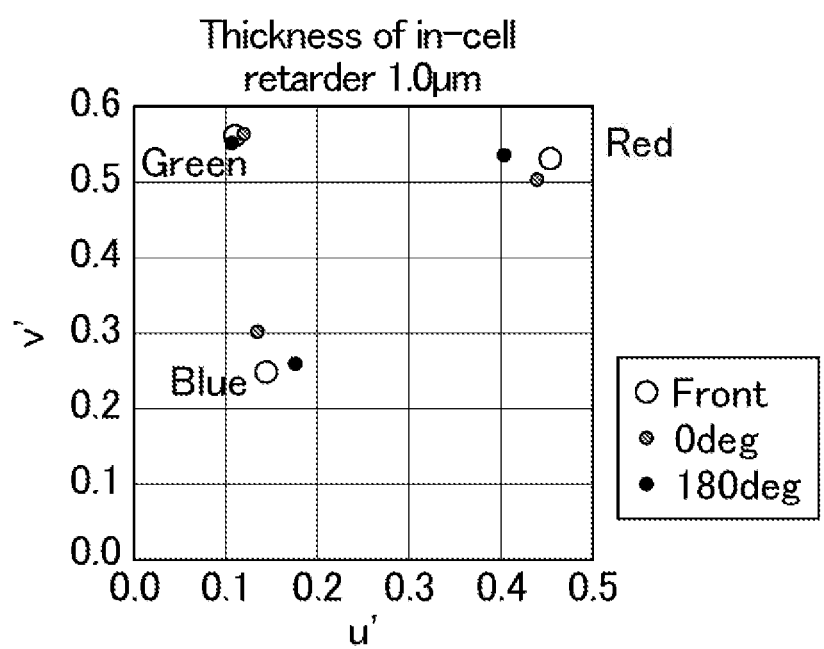
FIG. 10 is a graph of the results of calculating the chromaticity (u', v') when the panel displaying a single color selected from blue, green, and red was observed from the front and from an angle in Example 1, with a 1.0-μm-thick in-cell retarder.

The calculation results are as shown in FIGS. 8 to 10. FIGS. 8 to 10 are each a graph of the results of calculating the chromaticity (u', v') when the panel displaying a single color selected from blue, green, and red was observed from the front and from an angle in Example 1. FIGS. 8, 9, and 10 respectively indicate the cases where the thickness of the in-cell retarder 60 was 3.0 µm, 2.0 µm, and 1.0 µm. The results of calculating Δu'v' (distance between the chromaticity point when the panel was observed from the front and the chromaticity point when the panel was observed from an angle) that indicates the degree of color shift are shown in the following Tables 1 and 2. The results show that the Δu'v' values did not change even though the thickness of the in-cell retarder 60 increased. Further, even in comparison with the results in Comparative Example 1 to be described later in which a common LCD including neither a circularly polarizing plate nor an in-cell retarder was used, the Δu'v' values were equivalent to each other. This demonstrates that the low reflective LCD in the present embodiment can achieve a parallax color mixture level equivalent to that of a common LCD, i.e., within the tolerance.

TABLE 1

| Polar angle 60°/azimuth angle 0° | Δu'v' | | |
|---|---|---|---|
| Thickness of in-cell retarder (µm) | Blue | Green | Red |
| 1.0 | 0.054 | 0.010 | 0.031 |
| 2.0 | 0.054 | 0.010 | 0.031 |
| 3.0 | 0.054 | 0.010 | 0.031 |

TABLE 2

| Polar angle 60°/azimuth angle 180° | Δu'v' | | |
|---|---|---|---|
| Thickness of in-cell retarder (µm) | Blue | Green | Red |
| 1.0 | 0.033 | 0.010 | 0.050 |
| 2.0 | 0.033 | 0.010 | 0.050 |
| 3.0 | 0.033 | 0.010 | 0.050 |

In general, when the liquid crystal display device is observed from an angle, parallax color mixture occurs at a certain angle or greater. This is a phenomenon caused when light passed through a region where the liquid crystal is driven fails to pass through the color filter through which the light is to pass and passes an adjacent color filter of a different color.

The broken line arrow in FIG. 7 indicates the light beam that causes color mixture at the smallest angle. Specifically, this light beam is a straight line connecting two points indicated by the symbol ○ (an edge of the black matrix 43 and a corner of the region of the driven liquid crystal layer 30). Letting the minimum angle causing color mixture be θmin, the θmin value in the present embodiment is expressed by the following formula, which is the same formula as in Comparative Example 1 to be described later in which a common LCD is used. This indicates that the parallax color mixture level in the present embodiment is theoretically equivalent to that in Comparative Example 1.

$$\theta_{min} = \tan^{-1}\{(\text{width of black matrix}/2)/(\text{thickness of color filter} + \text{thickness of overcoat layer})\}$$

Embodiment 2

In the present embodiment, the features unique to the present embodiment are mainly described and the descriptions of the same contents as for Embodiment 1 are omitted as appropriate. In the present description, the components having the same or similar function have the same reference sign, and the same descriptions of these components are omitted.

Figure 11:
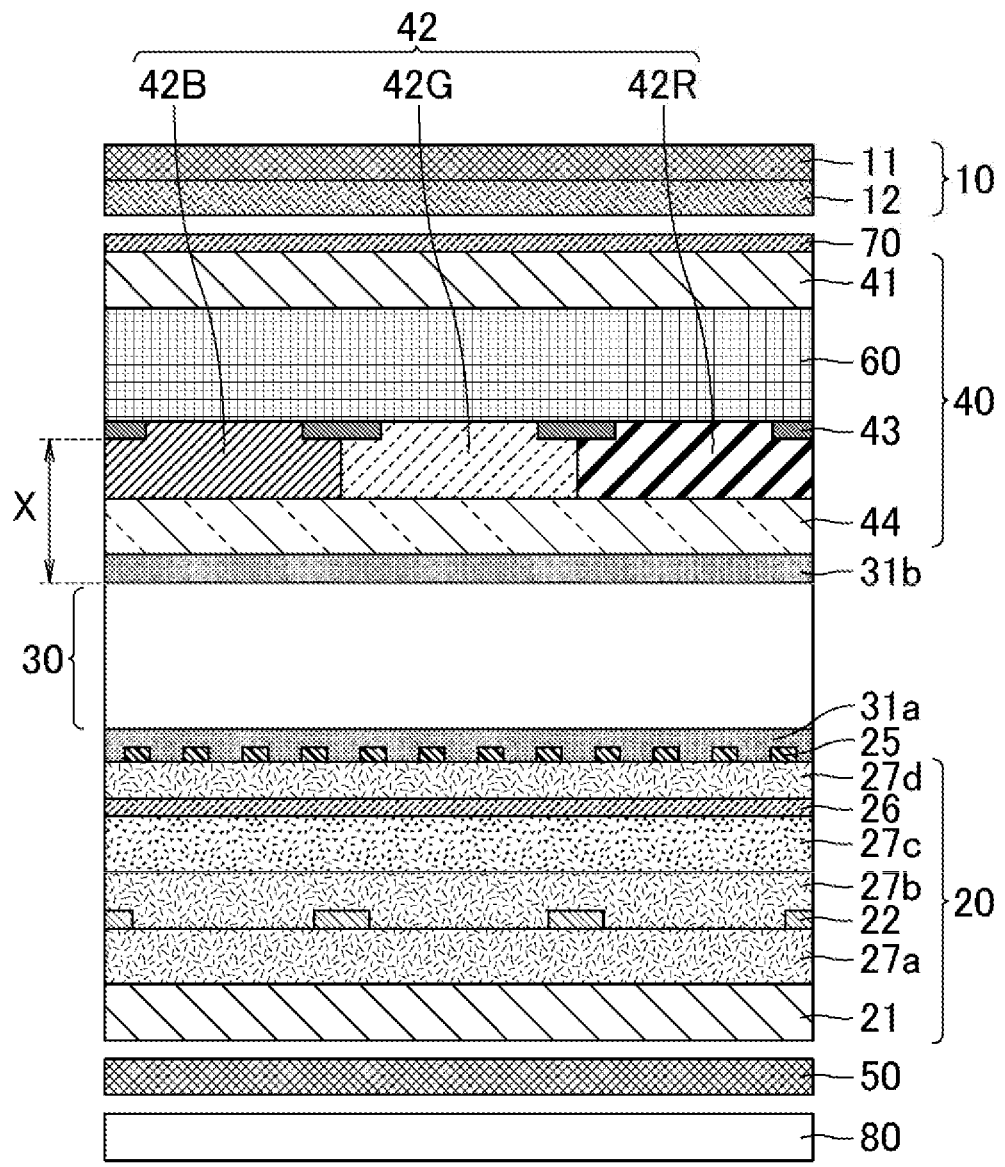
FIG. 11 is a schematic cross-sectional view of a structure of a liquid crystal display device of Embodiment 2.
Figure 12:
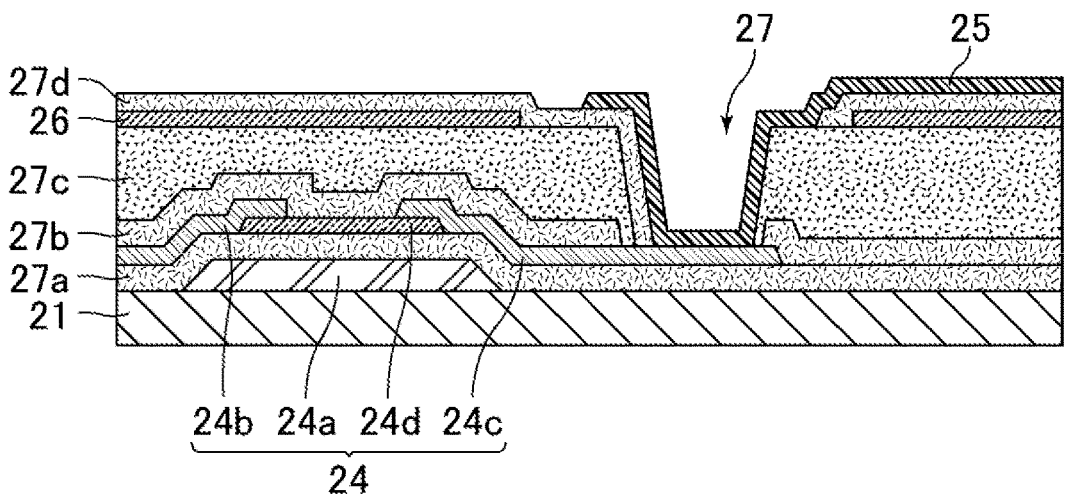
FIG. 12 is a schematic cross-sectional view of a TFT substrate of the liquid crystal display device of Embodiment 2, illustrating a TFT portion.

FIG. 11 is a schematic cross-sectional view of a structure of a liquid crystal display device of Embodiment 2. FIG. 12 is a schematic cross-sectional view of a TFT substrate of the liquid crystal display device of Embodiment 2, illustrating a TFT portion. FIG. 11 corresponds to the cross section taken along the X1-X2 line in FIG. 3. FIG. 12 corresponds to the cross section taken along the Y1-Y2 line in FIG. 3. The liquid crystal display device of the present embodiment is an FFS mode liquid crystal display device (low reflective LCD) including a circularly polarizing plate. As illustrated in FIG. 11, the liquid crystal display device sequentially includes, from the viewing side, the circularly polarizing plate 10, the color filter substrate 40, the liquid crystal layer 30, the TFT substrate 20, and the linearly polarizing plate 50. Accordingly, the liquid crystal display device of the present embodiment has a structure in which the color filter substrate 40, the liquid crystal layer 30, and the TFT substrate 20 are arranged in the stated order from the viewing side, similarly to a common liquid crystal display device. The transparent electrode 70 for preventing electrical charge is disposed on the viewing side surface of not the TFT substrate 20 but the color filter substrate 40.

In the present embodiment, the in-cell retarder 60 is disposed not in the TFT substrate 20 but in the color filter substrate 40. The in-cell retarder 60 is disposed on the support substrate 41 of the color filter substrate 40 and the color filter layer 42 and the black matrix 43 are disposed on the in-cell retarder 60.

As illustrated in FIGS. 11 and 12, the TFT substrate 20 in the present embodiment has substantially the same structure as the TFT substrate 20 in Embodiment 1 illustrated in FIGS. 3 and 4, except for the absence of the in-cell retarder 60. The TFT substrate 20 in the present embodiment may have substantially the same structure as another TFT substrate 20 in Embodiment 1 illustrated in FIGS. 5 and 6, except for the absence of the in-cell retarder 60.

Also in the present embodiment, the in-cell retarder 60 is disposed outside the region X between the black matrix 43 and the liquid crystal layer 30 as in Embodiment 1. In other words, the in-cell retarder 60 is not disposed in a region between the black matrix 43 and the liquid crystal layer 30. Specifically, the in-cell retarder 60 is disposed in the color filter substrate 40, and the in-cell retarder 60, the black matrix 43, the liquid crystal layer 30, and the TFT substrate 20 are arranged in the stated order from the viewing side. In this case, the distance between the black matrix 43 and the liquid crystal layer 30 can be not greater than the distance between the black matrix and the liquid crystal layer in a common LCD including no in-cell retarder. This can theoretically reduce the disadvantage of parallax color mixture that may be worsened by the presence of an in-cell retarder.

Further, disposing the circularly polarizing plate 10 on the viewing side of the liquid crystal panel and disposing the in-cell retarder 60 in the color filter substrate 40 on the viewing side allows the circularly polarizing plate 10 to absorb reflected light generated between the circularly polarizing plate 10 and the in-cell retarder 60, such as light reflected on a surface of the transparent electrode 70. This can reduce reflection of outside light and lead to good outside visibility.

Example 2

Figure 13:
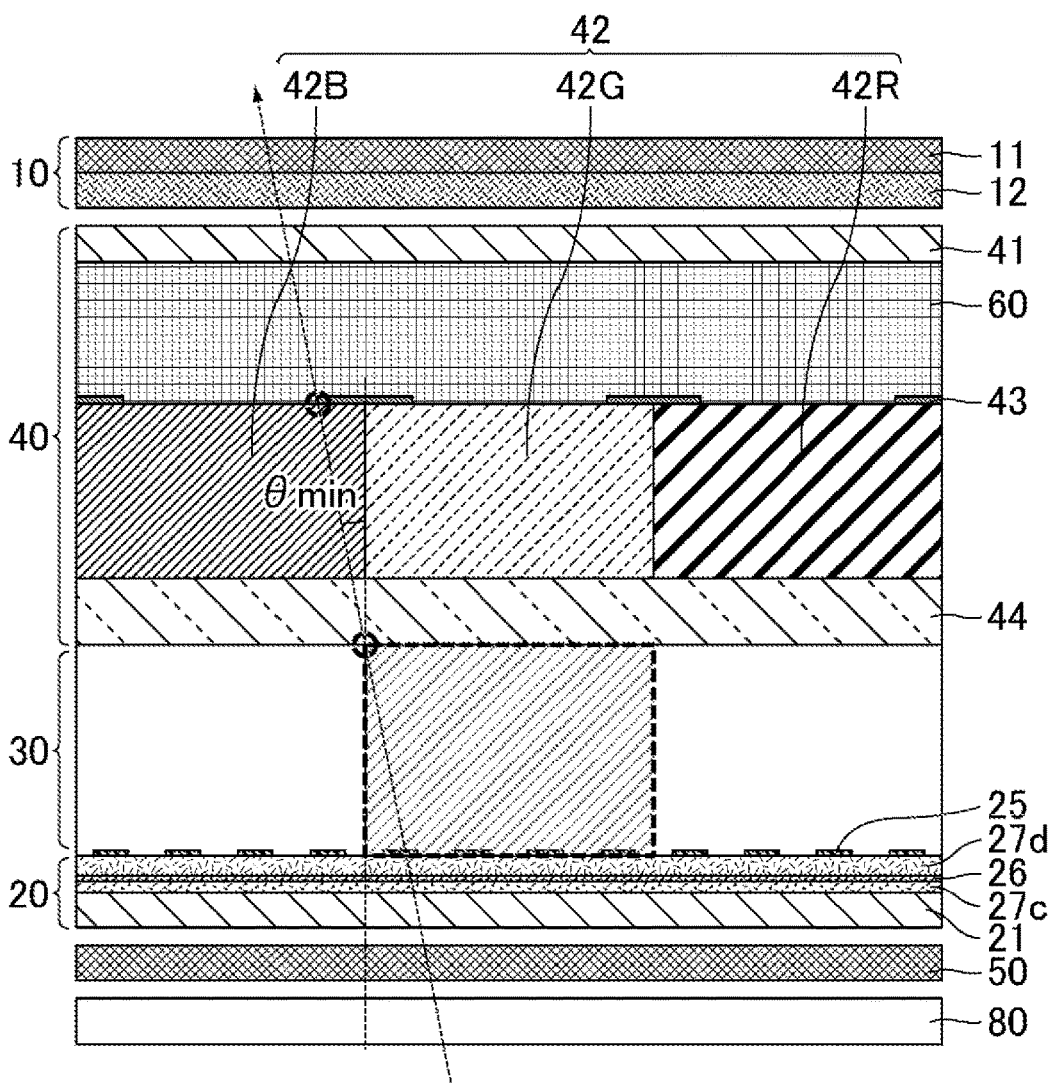
FIG. 13 is a cross-sectional view of a structure of a liquid crystal display device of Example 2 used for calculation.

Similarly to Example 1, with the structure of Embodiment 2, the chromaticity (u', v') was calculated using LCD Master when the panel displaying a single color selected from blue, green, red was observed from the front and from an angle (polar angle of 60° and an azimuth angle of 0° or 180°). FIG. 13 is a cross-sectional view of a structure of a liquid crystal display device of Example 2 used for calculation. The 2D model illustrated in FIG. 13 was used for calculation.

The parameters such as the thicknesses of the components are the same as those in Example 1. In other words, the thickness of the in-cell retarder 60 was set to 1.0 μm, 2.0 μm, or 3.0 μm. The thickness of the interlayer insulating film 27d was set to 0.2 μm. The line (L)/space (S) ratio of each pixel electrode 25 was set to 2.2 μm/3.2 μm. The thickness of the liquid crystal layer 30 was set to 3.0 μm. The thickness of the overcoat layer 44 was set to 1.0 μm. The widths of the red color filters 42R, the green color filters 42G, and the blue color filters 42B were each set to 21.2 μm. The thicknesses of the red color filters 42R, the green color filters 42G, and the blue color filters 42B were each set to 2.5 μm. The width of the black matrix 43 was set to 6.6 μm. The thickness of the interlayer insulating film 27c was set to 2.0 μm.

Figure 14:
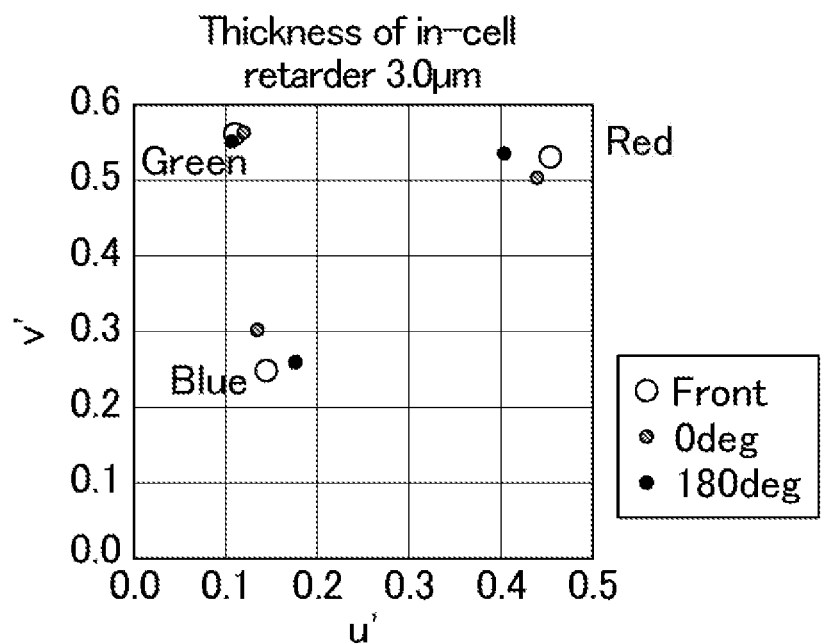
FIG. 14 is a graph of the results of calculating the chromaticity (u', v') when the panel displaying a single color selected from blue, green, and red was observed from the front and from an angle in Example 2, with a 3.0-μm-thick in-cell retarder.
Figure 15:
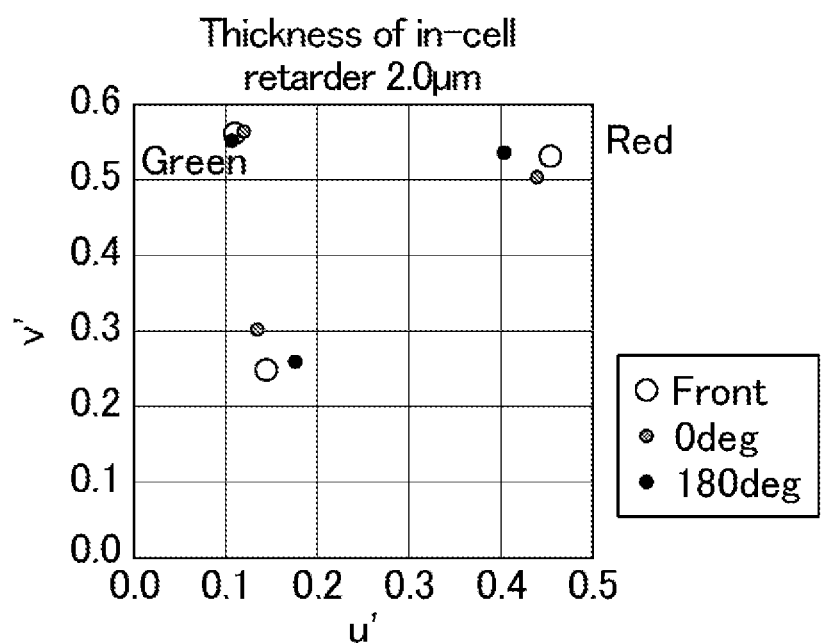
FIG. 15 is a graph of the results of calculating the chromaticity (u', v') when the panel displaying a single color selected from blue, green, and red was observed from the front and from an angle in Example 2, with a 2.0-μm-thick in-cell retarder.
Figure 16:
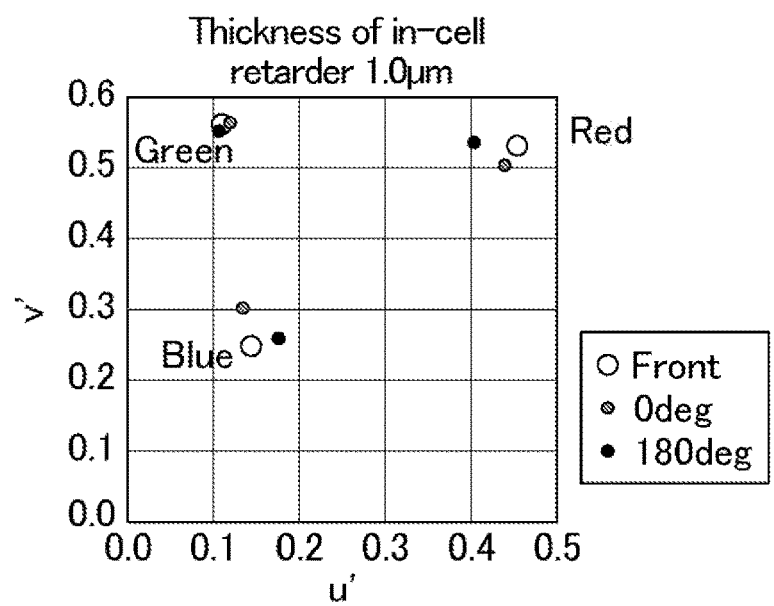
FIG. 16 is a graph of the results of calculating the chromaticity (u', v') when the panel displaying a single color selected from blue, green, and red was observed from the front and from an angle in Example 2, with a 1.0-μm-thick in-cell retarder.

The calculation results are shown in FIGS. 14 to 16. FIGS. 14 to 16 are each a graph of the results of calculating the chromaticity (u', v') when the panel displaying a single color selected from blue, green, and red was observed from the front and from an angle in Example 2. FIGS. 14, 15, and 16 respectively indicate the cases where the thickness of the in-cell retarder 60 was 3.0 μm, 2.0 μm, and 1.0 μm. The results of calculating Δu'v' that indicates the degree of color shift are shown in the following Tables 3 and 4. The results show that the Δu'v' values did not change even though the thickness of the in-cell retarder 60 increased. Further, even in comparison with the results in Comparative Example 1 to be described later, the Δu'v' values were equivalent to each other. This demonstrates that the low reflective LCD in the present embodiment can achieve a parallax color mixture level equivalent to that of a common LCD, i.e., within the tolerance.

TABLE 3

| Polar angle 60°/azimuth angle 0° | | Δu'v' | |
|---|---|---|---|
| Thickness of in-cell retarder (μm) | Blue | Green | Red |
| 1.0 | 0.054 | 0.010 | 0.031 |
| 2.0 | 0.054 | 0.010 | 0.031 |
| 3.0 | 0.054 | 0.010 | 0.031 |

TABLE 4

| Polar angle 60°/azimuth angle 180° | | Δu'v' | |
|---|---|---|---|
| Thickness of in-cell retarder (μm) | Blue | Green | Red |
| 1.0 | 0.033 | 0.010 | 0.050 |
| 2.0 | 0.033 | 0.010 | 0.050 |
| 3.0 | 0.033 | 0.010 | 0.050 |

As illustrated in FIG. 13, the θmin value in the present embodiment is expressed by the following formula, which is the same formula as in Comparative Example 1 to be described later. This indicates that the parallax color mixture level in the present embodiment is theoretically equivalent to that in Comparative Example 1.

$$\theta min = \tan^{-1}\{(\text{width of black matrix}/2)/(\text{thickness of color filter}+\text{thickness of overcoat layer})\}$$

Comparative Embodiment 1

In the present comparative embodiment, the features unique to the present comparative embodiment are mainly described and the descriptions of the same contents as for Embodiments 1 and 2 are omitted as appropriate.

Figure 17:
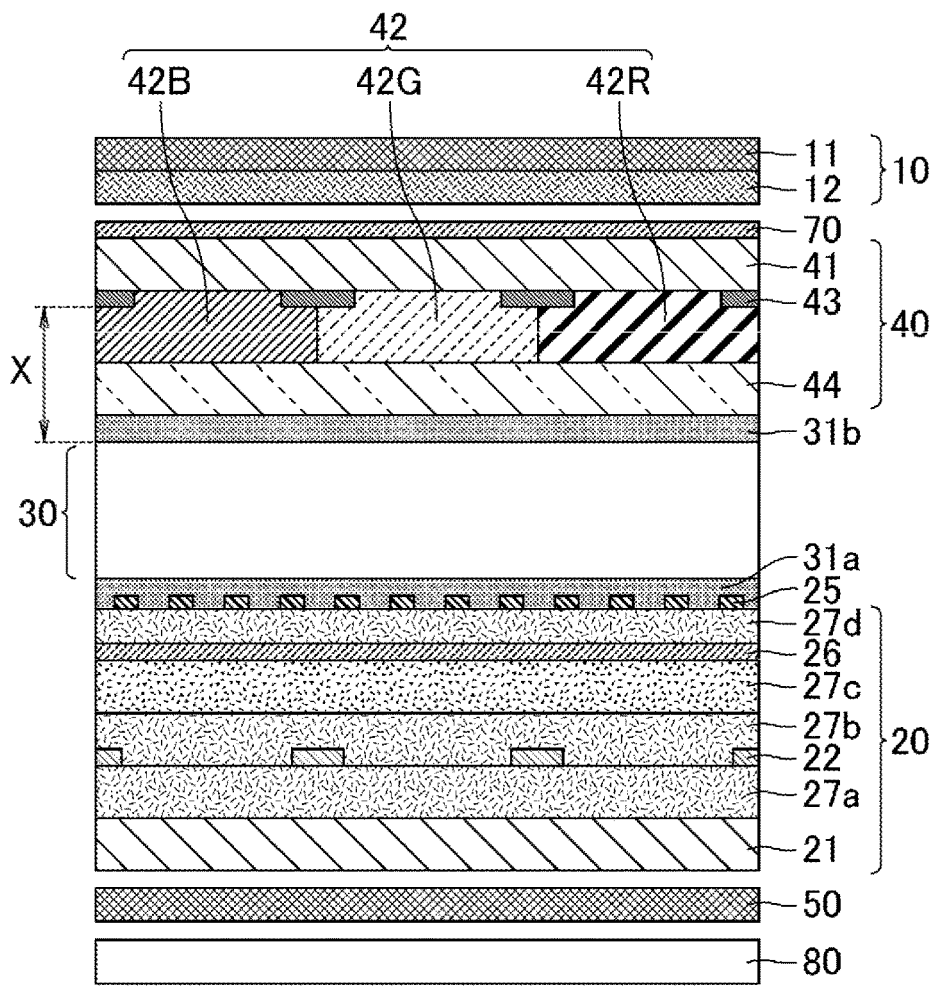
FIG. 17 is a schematic cross-sectional view of a structure of a liquid crystal display device of Comparative Embodiment 1.

FIG. 17 is a schematic cross-sectional view of a structure of a liquid crystal display device of Comparative Embodiment 1. FIG. 17 corresponds to the cross section taken along the X1-X2 line in FIG. 3. The liquid crystal display device of the present comparative embodiment is a common FFS mode liquid crystal display device (common LCD) including neither a circularly polarizing plate or an in-cell retarder, and is substantially the same as the liquid crystal display device of Embodiment 2, except for the absence of the out-cell retarder 12 and the in-cell retarder 60, as illustrated in FIG. 17.

Comparative Example 1

Figure 18:
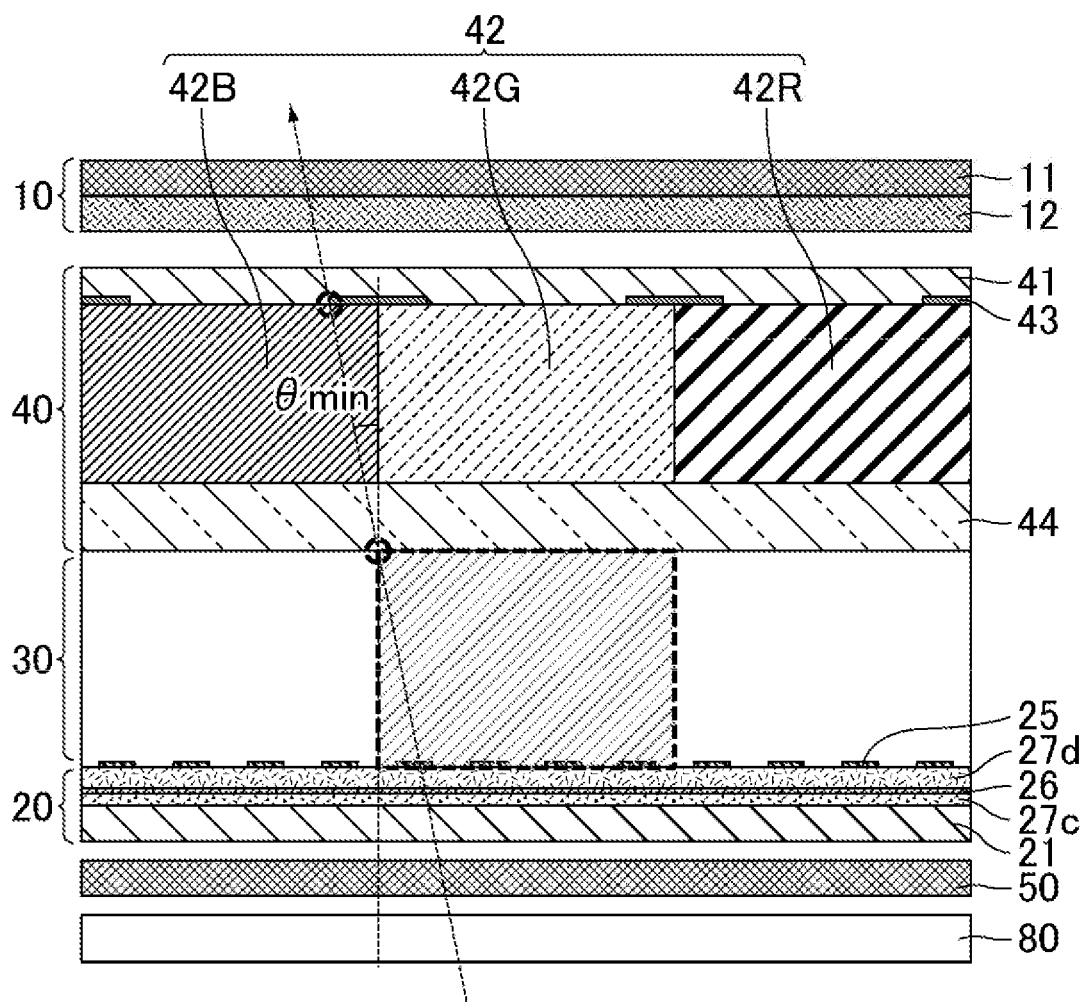
FIG. 18 is a cross-sectional view of a structure of a liquid crystal display device of Comparative Example 1 used for calculation.

Similarly to Example 1, with the structure of Comparative Embodiment 1, the chromaticity (u', v') was calculated using LCD Master when the panel displaying a single color selected from blue, green, red was observed from the front and from an angle (polar angle of 60° and an azimuth angle of 0° or 180°). FIG. 18 is a cross-sectional view of a structure of a liquid crystal display device of Comparative Example 1 used for calculation. The 2D model illustrated in FIG. 18 was used for calculation.

The parameters such as the thicknesses of the components are the same as those in Example 1. In other words, the thickness of the interlayer insulating film 27d was set to 0.2 μm. The line (L)/space (S) ratio of each pixel electrode 25 was set to 2.2 μm/3.2 μm. The thickness of the liquid crystal layer 30 was set to 3.0 μm. The thickness of the overcoat layer 44 was set to 1.0 μm. The widths of the red color filters 42R, the green color filters 42G, and the blue color filters 42B were each set to 21.2 μm. The thicknesses of the red color filters 42R, the green color filters 42G, and the blue color filters 42B were each set to 2.5 μm. The width of the black matrix 43 was set to 6.6 μm. The thickness of the interlayer insulating film 27c was set to 2.0 μm.

Figure 19:
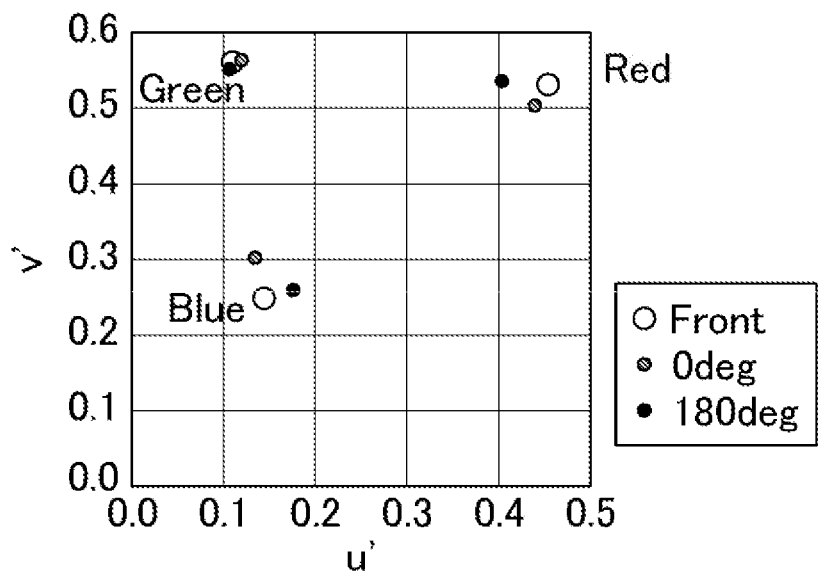
FIG. 19 is a graph of the results of calculating the chromaticity (u', v') when the panel displaying a single color selected from blue, green, and red was observed from the front and from an angle in Comparative Example 1.

The calculation results are shown in FIG. 19. FIG. 19 is a graph of the results of calculating the chromaticity (u', v') when the panel displaying a single color selected from blue, green, and red was observed from the front and from an angle in Comparative Example 1. The results of calculating Δu'v' that indicates the degree of color shift are shown in the following Tables 5 and 6. These results are taken as the parallax color mixture tolerance level, which is used for comparison with the aforementioned Examples 1 and 2 and with Comparative Example 2 to be described later.

TABLE 5

| Polar angle 60°/azimuth angle 0° | | |
|---|---|---|
| Δu'v' | | |
| Blue | Green | Red |
| 0.054 | 0.010 | 0.032 |

TABLE 6

| Polar angle 60°/azimuth angle 180° | | |
|---|---|---|
| Δu'v' | | |
| Blue | Green | Red |
| 0.034 | 0.010 | 0.050 |

As illustrated in FIG. 18, the θmin value in the present comparative embodiment is expressed by the following formula, which depends on the width of the black matrix, the thickness of the color filter, and the thickness of the overcoat layer in the case of a common LCD.

$$\theta min = \tan^{-1}\{(\text{width of black matrix}/2)/(\text{thickness of color filter}+\text{thickness of overcoat layer})\}$$

Comparative Embodiment 2

In the present comparative embodiment, the features unique to the present comparative embodiment are mainly described and the descriptions of the same contents as for Embodiments 1 and 2 are omitted as appropriate.

Figure 20:
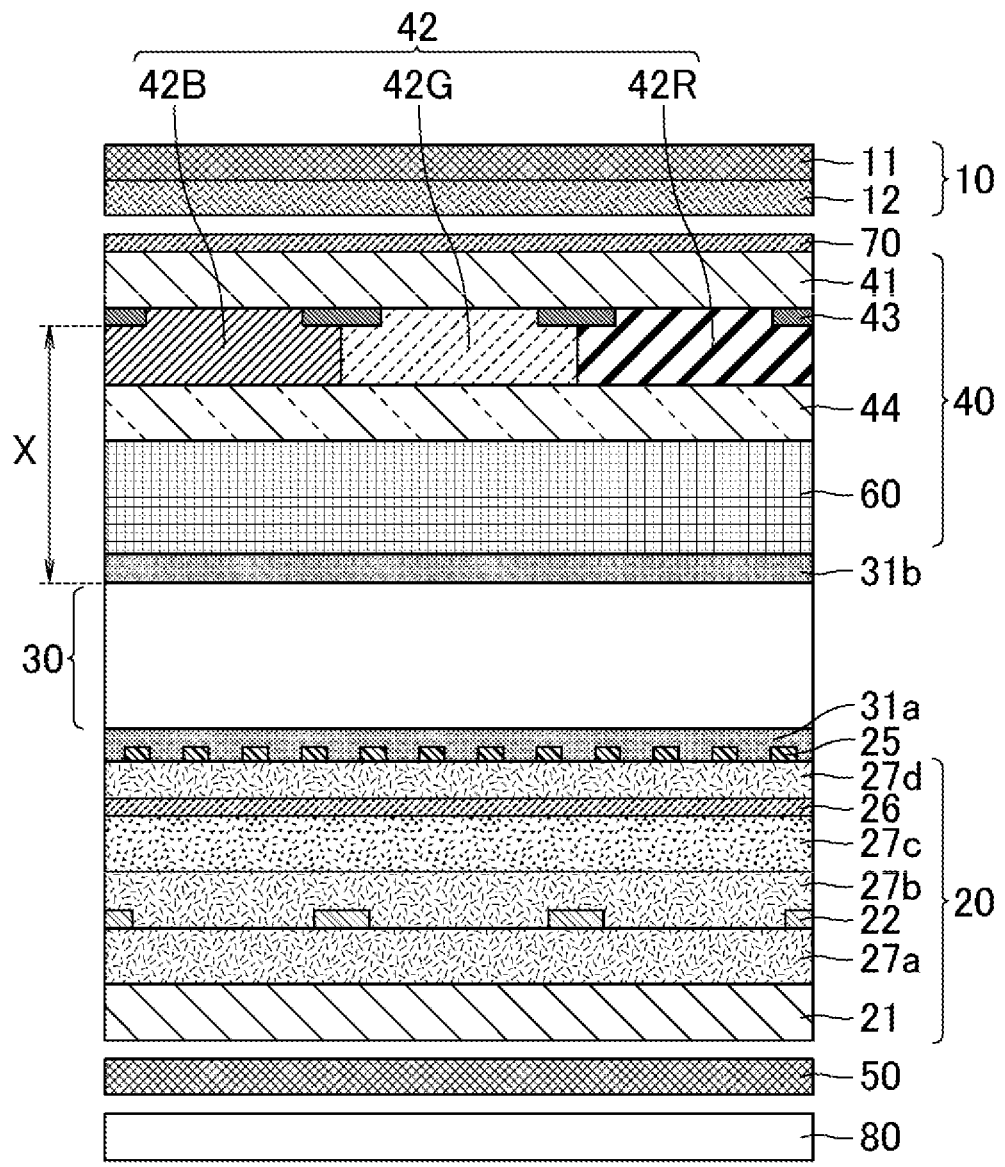
FIG. 20 is a schematic cross-sectional view of a structure of a liquid crystal display device of Comparative Embodiment 2.

FIG. 20 is a schematic cross-sectional view of a structure of a liquid crystal display device of Comparative Embodiment 2. FIG. 20 corresponds to the cross section taken along the X1-X2 line in FIG. 3. The liquid crystal display device of the present comparative embodiment is an FFS mode liquid crystal display device (low reflective LCD) including a circularly polarizing plate, and is substantially the same as the liquid crystal display device of Embodiment 2, except that the in-cell retarder 60 is disposed inside the region X between the black matrix 43 and the liquid crystal layer 30, specifically on the liquid crystal layer 30 side of the overcoat layer 44, as illustrated in FIG. 20.

Comparative Example 2

Figure 21:
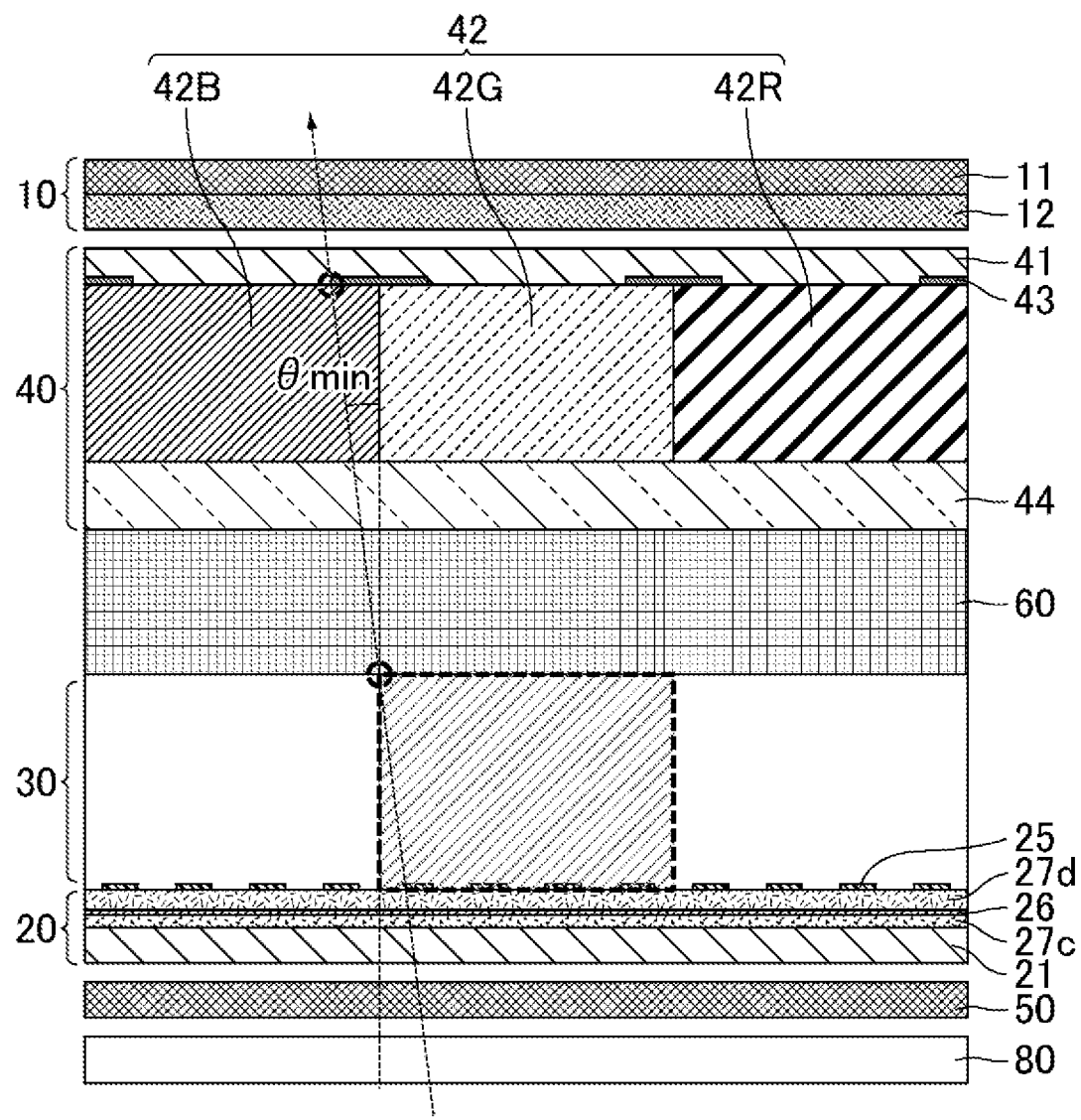
FIG. 21 is a cross-sectional view of a structure of a liquid crystal display device of Comparative Example 2 used for calculation.

Similarly to Example 1, with the structure of Comparative Embodiment 2, the chromaticity (u', v') was calculated using LCD Master when the panel displaying a single color selected from blue, green, red was observed from the front and from an angle (polar angle of 60° and an azimuth angle of 0° or 180°). FIG. 21 is a cross-sectional view of a structure of a liquid crystal display device of Comparative Example 2 used for calculation. The 2D model illustrated in FIG. 21 was used for calculation.

The parameters such as the thicknesses of the components are the same as those in Example 1. In other words, the thickness of the in-cell retarder 60 was set to 1.0 μm, 2.0 μm, or 3.0 μm. The thickness of the interlayer insulating film 27d was set to 0.2 μm. The line (L)/space (S) ratio of each pixel electrode 25 was set to 2.2 μm/3.2 μm. The thickness of the liquid crystal layer 30 was set to 3.0 μm. The thickness of the overcoat layer 44 was set to 1.0 μm. The widths of the red color filters 42R, the green color filters 42G, and the blue color filters 42B were each set to 21.2 μm. The thicknesses of the red color filters 42R, the green color filters 42G, and the blue color filters 42B were each set to 2.5 μm. The width of the black matrix 43 was set to 6.6 μm. The thickness of the interlayer insulating film 27c was set to 2.0 μm.

Figure 22:
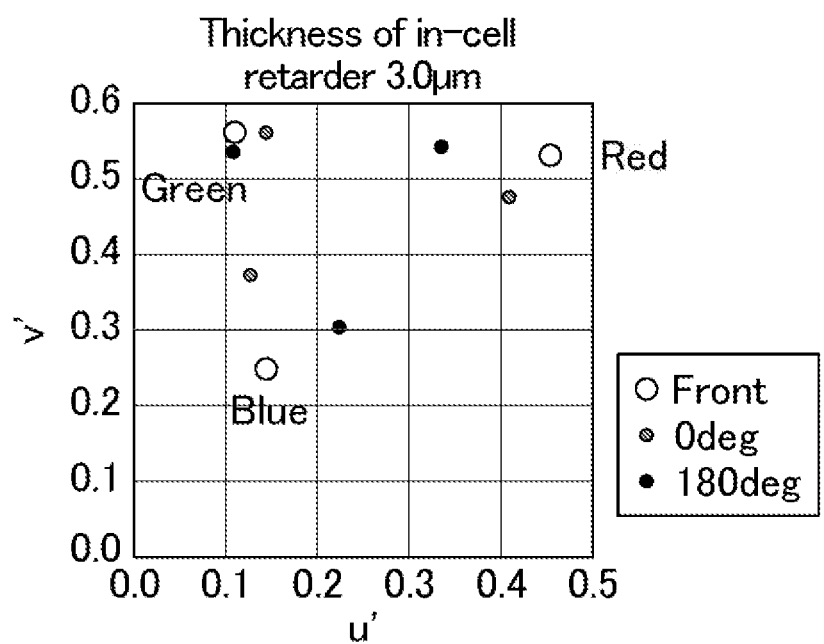
FIG. 22 is a graph of the results of calculating the chromaticity (u', v') when the panel displaying a single color selected from blue, green, and red was observed from the front and from an angle in Comparative Example 2, with a 3.0-μm-thick in-cell retarder.
Figure 23:
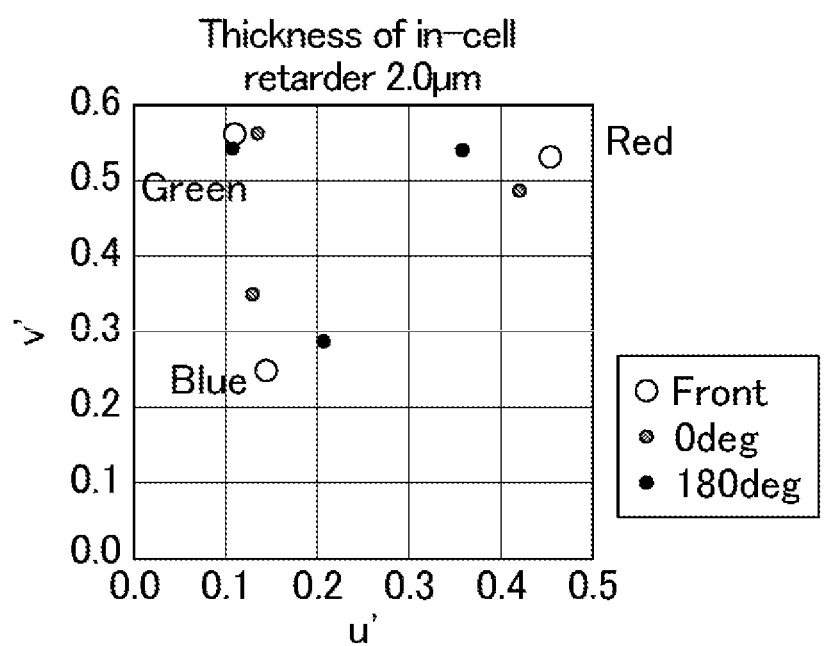
FIG. 23 is a graph of the results of calculating the chromaticity (u', v') when the panel displaying a single color selected from blue, green, and red was observed from the front and from an angle in Comparative Example 2, with a 2.0-μm-thick in-cell retarder.
Figure 24:
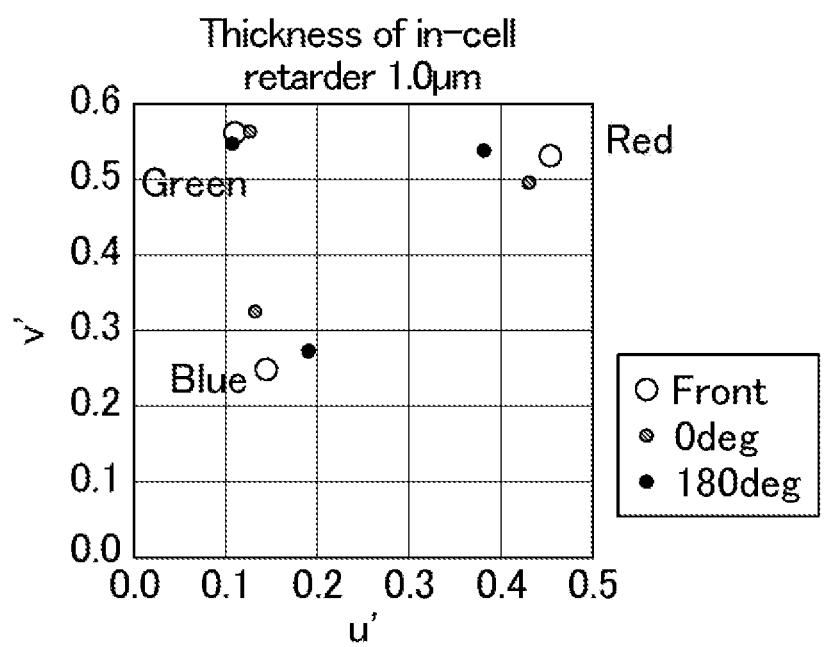
FIG. 24 is a graph of the results of calculating the chromaticity (u', v') when the panel displaying a single color selected from blue, green, and red was observed from the front and from an angle in Comparative Example 2, with a 1.0-μm-thick in-cell retarder.

The calculation results are shown in FIGS. 22 to 24. FIG. 22 to 24 are each a graph of the results of calculating the chromaticity (u', v') when the panel displaying a single color selected from blue, green, and red was observed from the front and from an angle in Comparative Example 2. FIGS. 22, 23, and 24 respectively indicates the cases where the thickness of the in-cell retarder 60 was 3.0 μm, 2.0 μm, and 1.0 μm. The results of calculating Δu'v' that indicates the degree of color shift are shown in the following Tables 7 and 8. The greater the thickness of the in-cell retarder 60 is, the higher the Δu'v' value is. This demonstrates the parallax color mixture is worsened. In comparison with the results in Comparative Example 1, the Δu'v' value was higher in every case. This demonstrates that the low reflective LCD of Comparative Embodiment 2 exhibits a higher parallax color mixture level than a common LCD.

TABLE 7

| Polar angle 60°/azimuth angle 0° | | Δu'v' | |
| --- | --- | --- | --- |
| Thickness of in-cell retarder (μm) | Blue | Green | Red |
| 1.0 | 0.077 | 0.017 | 0.043 |
| 2.0 | 0.102 | 0.025 | 0.056 |
| 3.0 | 0.125 | 0.035 | 0.071 |

TABLE 8

| Polar angle 60°/azimuth angle 180° | | Δu'v' | |
| --- | --- | --- | --- |
| Thickness of in-cell retarder (μm) | Blue | Green | Red |
| 1.0 | 0.052 | 0.015 | 0.072 |
| 2.0 | 0.073 | 0.020 | 0.096 |
| 3.0 | 0.096 | 0.026 | 0.119 |

As illustrated in FIG. 21, the θmin value in the present comparative embodiment is expressed by the following formula, which indicates that the angle of causing color mixture is smaller by the thickness of the in-cell retarder 60 (color mixture occurs even at an angle close to the front) in comparison with the formula in Comparative Example 1.

$$\theta_{min} = \tan^{-1}\{(\text{width of black matrix}/2)/(\text{thickness of color filter} + \text{thickness of overcoat layer} + \text{thickness of in-cell retarder})\}$$

What is claimed is:

1. A liquid crystal display device comprising:
a liquid crystal panel; and
a circularly polarizing plate disposed on a viewing side of the liquid crystal panel,
the circularly polarizing plate sequentially including, from the viewing side, a linearly polarizing plate and an out-cell retarder,
the liquid crystal panel including:
a thin-film transistor substrate;
a color filter substrate facing the thin-film transistor substrate and including a black matrix;
a horizontal alignment liquid crystal layer disposed between the thin-film transistor substrate and the color filter substrate; and
an in-cell retarder disposed in one substrate disposed on the viewing side selected from the thin-film transistor substrate and the color filter substrate,
the in-cell retarder being disposed outside a region between the black matrix and the horizontal alignment liquid crystal layer,
wherein the in-cell retarder is disposed in the thin-film transistor substrate, and the liquid crystal panel sequentially includes, from the viewing side, the thin-film transistor substrate including the in-cell retarder, the horizontal alignment liquid crystal layer, and the color filter substrate including the black matrix.

2. The liquid crystal display device according to claim 1, wherein the thin-film transistor substrate includes a thin-film transistor, a pixel electrode coupled with the thin-film transistor, and a common electrode facing the pixel electrode, and the pixel electrode and the common electrode are disposed on a back side of the in-cell retarder.

3. The liquid crystal display device according to claim 1, wherein the thin-film transistor substrate includes a conductive line layer including a metal line and a thin-film transistor coupled with the metal line, and
the conductive line layer is disposed on the viewing side of the in-cell retarder.

* * * * *